US009534138B2

(12) United States Patent
Economy et al.

(10) Patent No.: US 9,534,138 B2
(45) Date of Patent: Jan. 3, 2017

(54) POLYMER COATING SYSTEM FOR IMPROVED TRIBOLOGICAL PERFORMANCE

(71) Applicant: ATSP Innovations, LLC, Champaign, IL (US)

(72) Inventors: James Economy, Urbana, IL (US); Andreas Polycarpou, College Station, TX (US); Jacob Meyer, Urbana, IL (US)

(73) Assignee: ATSP Innovations, Champaign, IL (US)

( * ) Notice: Subject to any disclaimer, the term of this patent is extended or adjusted under 35 U.S.C. 154(b) by 69 days.

(21) Appl. No.: 14/700,265

(22) Filed: Apr. 30, 2015

(65) Prior Publication Data
US 2015/0284586 A1 Oct. 8, 2015

Related U.S. Application Data

(63) Continuation-in-part of application No. 14/577,821, filed on Dec. 19, 2014, now abandoned, which is a
(Continued)

(51) Int. Cl.
B05D 1/06 (2006.01)
B05D 3/02 (2006.01)
C08G 63/127 (2006.01)
C09D 167/00 (2006.01)
C23C 4/00 (2016.01)
C08G 63/133 (2006.01)

(52) U.S. Cl.
CPC ............ C09D 167/00 (2013.01); B05D 1/06 (2013.01); B05D 3/0254 (2013.01); C08G 63/127 (2013.01); C08G 63/133 (2013.01); C23C 4/00 (2013.01); B05D 2202/00 (2013.01); B05D 2506/15 (2013.01)

(58) Field of Classification Search
CPC ... B05D 1/06; B05D 2202/00; B05D 2506/15; B05D 3/0254
See application file for complete search history.

(56) References Cited

U.S. PATENT DOCUMENTS 5,439,541 A * 8/1995 Economy ............ B32B 37/1207
156/182
2003/0092875 A1* 5/2003 Okamoto ............... C08G 69/44
528/272

OTHER PUBLICATIONS

Zhang et al., An Improved Tribological Polymer-Coating System for Metal Surfaces, Tribol Lett (2010) 38:355-365.*

* cited by examiner

Primary Examiner — James M Mellott
(74) Attorney, Agent, or Firm — Adam K. Sacharoff; Much Shelist

(57) ABSTRACT

A novel Aromatic Thermosetting Copolyester (ATSP) can be processed into highly effective wear resistant coatings by blending with polytetrafluorethylene (PTFE) and other additives. Surface treatments/coatings are key to improving wear performance and durability in a wide array of applications. The problems associated with use of liquid lubricants, hard/soft coatings are well known but only modest progress has been achieved due to lack of research on new material systems. These coatings were fabricated and tested as highly effective wear resistant coatings by blending ATSP with PTFE and other tribologically beneficial additives. The main advantages of these polymeric-based coatings are their relatively low cost and simple substrate surface conditioning (i.e., no need for expensive surface preparation before coating).

14 Claims, 25 Drawing Sheets

Related U.S. Application Data continuation-in-part of application No. 13/911,845, filed on Jun. 6, 2013, now abandoned.

(60) Provisional application No. 61/656,921, filed on Jun. 7, 2012.

FIG. 3A  FIG. 3B  FIG. 3C
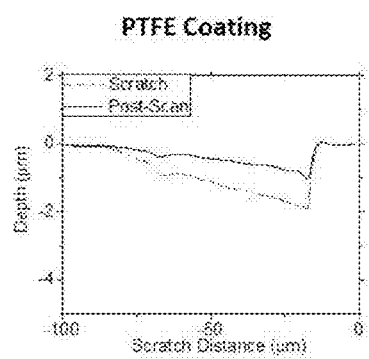
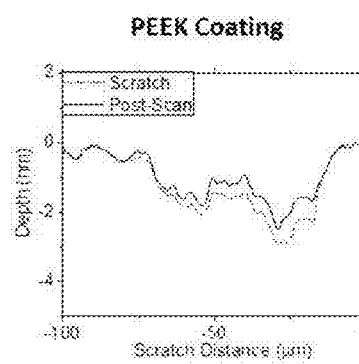
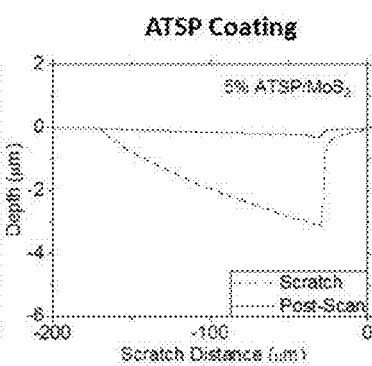
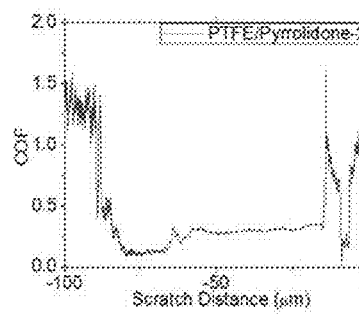
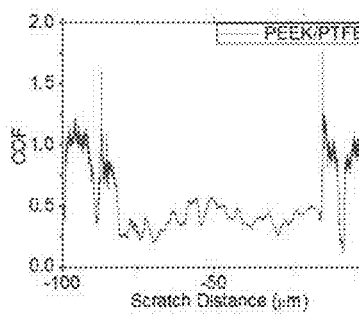
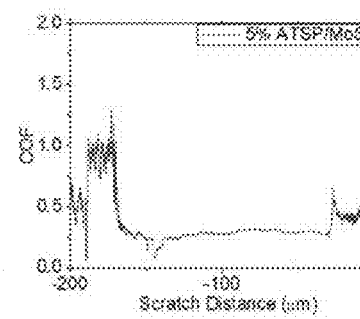
FIG. 3D  FIG. 3E  FIG. 3F FIG. 4A
FIG. 4B
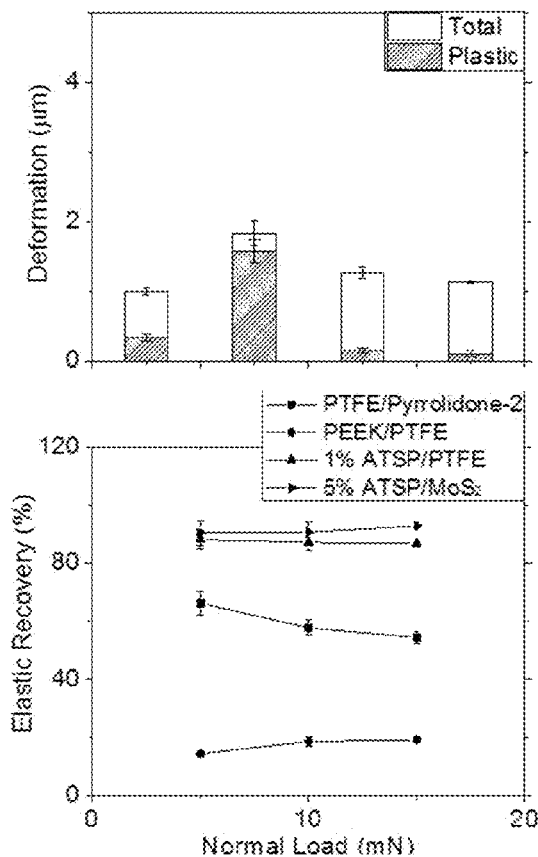
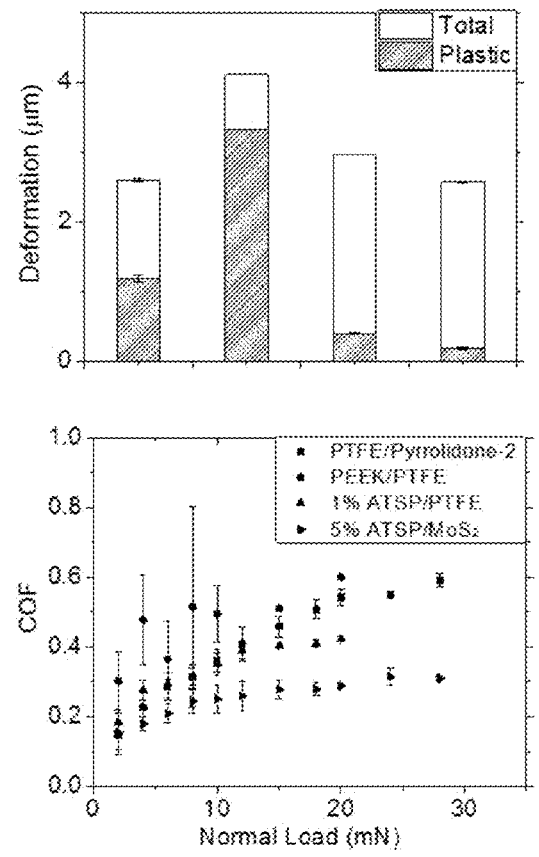
FIG. 4C
FIG. 4D FIG. 10E
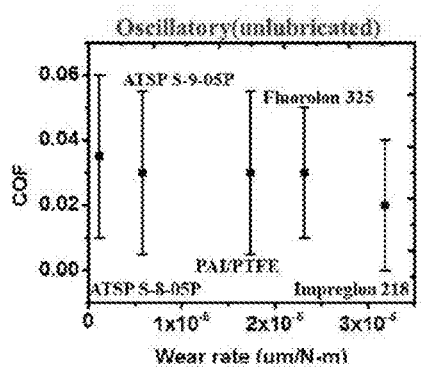
FIG. 10F
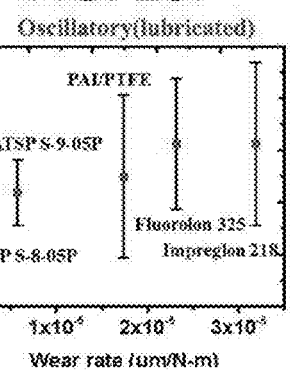
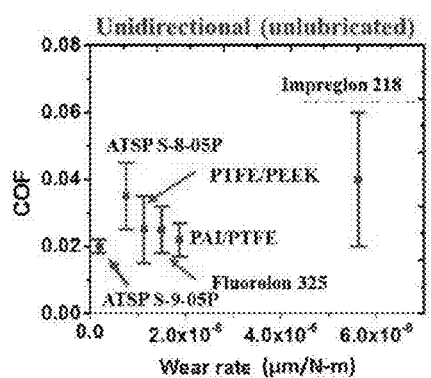
FIG. 10G
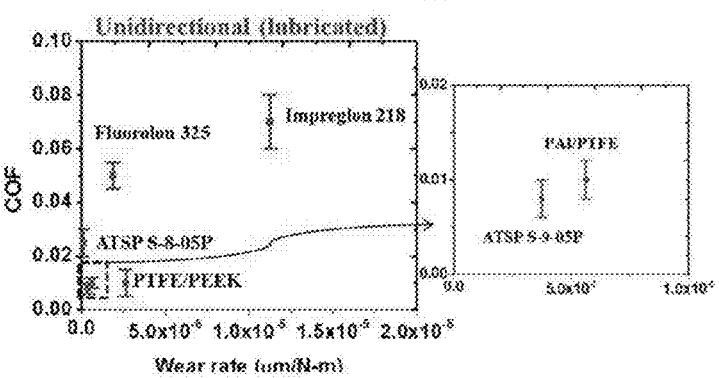
FIG. 10H

POLYMER COATING SYSTEM FOR IMPROVED TRIBOLOGICAL PERFORMANCE

CROSS-REFERENCE TO RELATED APPLICATIONS

The present application is a continuation-in-part of U.S. patent application Ser. No. 14/577,821, filed Dec. 19, 2014, now abandoned which is a continuation-in-part of U.S. patent application Ser. No. 13/911,845, filed Jun. 6, 2013, now abandoned which claims the benefit of U.S. Provisional Patent Application No. 61/656,921, filed Jun. 7, 2012. Each above-mentioned patent application is hereby incorporated by reference in its entirety.

STATEMENT OF GOVERNMENT SUPPORT

This invention was made with government support under NSF SBIR Phase I and Phase II awards with contract numbers 1113825 and 1230439, respectively.

BACKGROUND OF THE INVENTION

Protective thin film coatings ranging in thickness from a few nanometers to several micrometers are used to protect surfaces that are in contact and sliding. These coatings can be found in applications such as magnetic storage hard disk drives, compressors, engines, biological devices and many others. Compressors and similar industrial equipment comprise moving parts that are subject to constant wear and fatigue because of prolonged surface contact and motion. Without protective treatment of the surfaces, equipment that utilizes internally moving parts can suffer from catastrophic failures. Next-generation compressors are being designed to withstand stringent contact and operating conditions, including oil-less or low-lubricant operation. Surface treatments/coatings are key to improving performance and durability for these applications since advanced ultra-low wear and inexpensive coatings would substantially reduce operating costs.

In recent years, great efforts have been made in the formulation of solid lubricants and solid lubricant coatings to achieve desired levels of performance or durability that conventional materials and lubricants cannot provide. Numerous techniques and diverse materials have been used to develop new solid coatings. For simplicity, coatings can be classified into two broad categories—soft coatings (hardness <10 GPa) and hard coatings (hardness >10 GPa). Conventionally, hard coatings such as diamond-like carbon (DLC), Ti—N and WC/C are synthesized through physical vapor deposition (PVD) and chemical vapor deposition (CVD) techniques. These are thought to be effective in preventing both abrasive and adhesive wear of metal sliding contacts. However, hard coatings are relatively expensive and are difficult to coat on substrates with low surface energies, high roughness, and/or complex geometries. They also often wear out the counterface they slide against due to their relatively high hardness.

Due to these concerns with hard coatings, recent attention has focused on soft, thermoplastic-based polymers such as polytetrafluoroethylene (PTFE) and polyether ether ketone (PEEK), which show relatively low friction coefficient and self-lubricating properties. Significant work has been performed with bulk polymeric blends based on PTFE and PEEK for high bearing applications. The main advantages of the polymeric-based coatings are their relatively low cost and simple substrate surface conditioning (i.e., no need for expensive surface preparation before coating). Despite the improvements in wear offered by bulk polymer blends, they are not likely to replace critical components in compressors (and other machinery) since polymeric coatings still exhibit the following problems:

their wear rate is still high (compared to hard coatings);
  because they rely heavily on the interaction between the PTFE/PEEK wear debris/solid lubricant (debris film) and the substrate for surface protection, in the presence of lubricant they may become ineffective;
  the addition of hard particles in these mixtures scratches the counterface, thus creating excessive abrasive wear;
  the wear debris likely contains hard particles that can damage downstream machinery; and
  they often have low glass transition temperatures ($T_g$<150° C.), which limits the operating temperature.

However, little work has been done on new high bearing polymeric-based coatings that would overcome the shortcomings highlighted above, which are highly desirable in most industrial applications.

BRIEF SUMMARY OF THE INVENTION

Embodiments of the present invention provide a method for fabricating a tribological coating precursor from aromatic thermosetting copolyesters (ATSP) and applying the coating precursor to a substrate to form a coating on the surface of the substrate.

In an embodiment of the present invention, a coating precursor is fabricated by dissolving ATSP oligomers in a solvent, and the coating precursor is applied to a substrate using a spray coating method. In accordance with such embodiments, ATSP oligomers are produced by reacting ATSP precursor monomers to form an oligomer having a carboxylic acid end group and an oligomer having an acetoxy end group, and curing the oligomers to cause the end groups to react and form crosslinks. A catalyst may be used in such a reaction to decrease the curing temperature.

In another embodiment of the present invention, a coating precursor is fabricated by polymerizing ATSP precursor monomers to form fully or partially cured ATSP powder. The coating precursor may be applied to a substrate using a consolidation and sintering process, or may be applied to a substrate using a thermal or plasma spraying process.

In another embodiment of the present invention, a coating precursor is fabricated by heating ATSP oligomers to produce a melt, and the coating precursor is applied to a substrate using a dip coating method or a wire coating method. In accordance with such embodiments, ATSP oligomers are produced by reacting ATSP precursor monomers to form an oligomer having a carboxylic acid end group and an oligomer having an acetoxy end group, and curing the oligomers to cause the end groups to react and form crosslinks. A catalyst may be used in such a reaction to decrease the curing temperature.

BRIEF DESCRIPTION OF THE DRAWINGS

FIGS. 3A through 3F illustrates the results of scratch experiments conducted on PTFE-coated, PEEK-coated, and ATSP-coated cast-iron disks.

FIGS. 4A through 4D illustrate elastic versus plastic deformation for PTFE-, PEEK-, and ATSP-coated cast-iron disks.

FIGS. 10E through 10H illustrate the results of FIGS. 10A through 10D labeled with trade names.

DETAILED DESCRIPTION OF THE INVENTION

Figure 1:
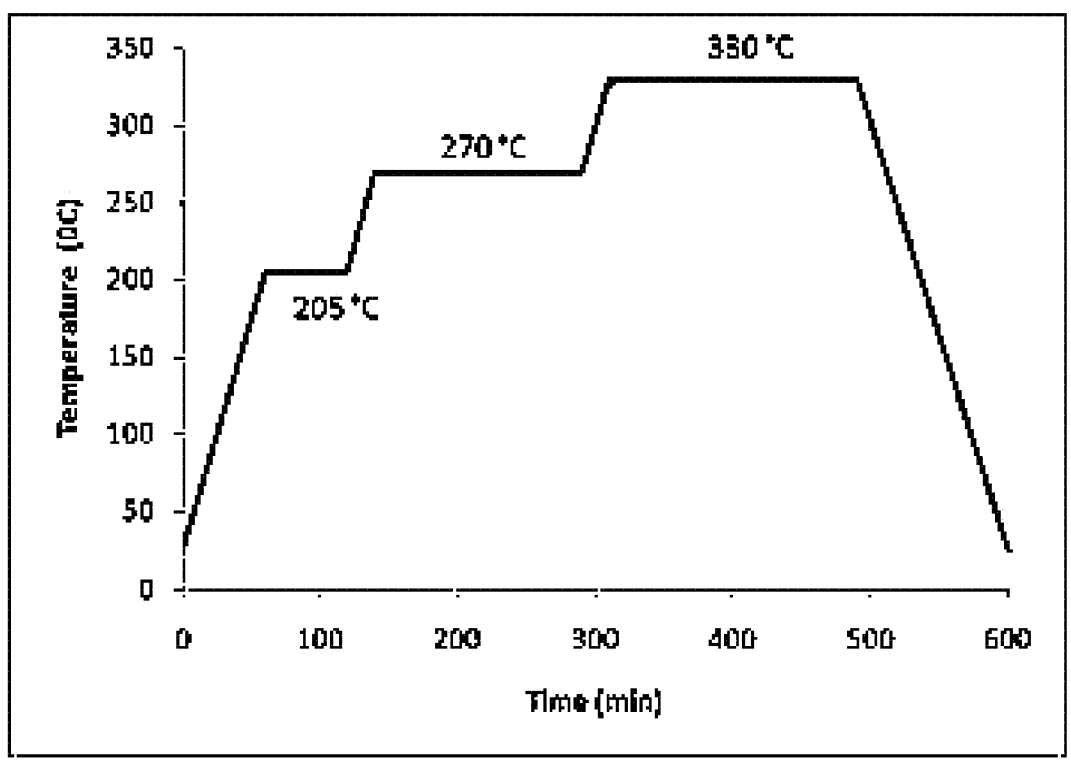
FIG. 1 illustrates a typical cure schedule for a spray coating method of coating a substrate with ATSP coating precursors.

In a first embodiment, the present invention provides a method for fabricating a tribological coating by dissolving aromatic thermosetting polyesters (ATSP) oligomers in a solvent followed by spraying onto a substrate and then curing the coating. This method has yielded excellent results in terms of thickness uniformity, smoothness, adhesion, and tribological properties. In addition, several variations of the ATSP oligomeric recipe are available to further improve the performance and also yield a melt processible system. This would be extremely useful for large-scale production by eliminating the solvent and simplifying the coating fabrication.

Another embodiment of this invention is a method for producing ATSP powders that can be formed into a tribological coating through methods such as hot press sintering or thermal/plasma spray.

The addition of a catalyst has been shown to aid in lowering the reaction temperature needed to either synthesize ATSP powder or cure ATSP oligomers.

Embodiments of the present invention provide methods of forming ATSP copolyesters by reacting precursor monomers. A first precursor monomer is selected from 1,4-phenylene diacetate (HQDA), 1,3-phenylene diacetate (RDA), [1,1'-biphenyl]-4,4'-diyl diacetate, propane-2,2-diylbis(4,1-phenylene) diacetate, sulfonylbis(4,1-phenylene) diacetate (1:1:1:1:1), phenyl acetate, nonane-1,9-diyl diacetate, decane-1,10-diyl diacetate, 4,4'-oxydianiline, benzene-1,4-diamine, and benzene-1,3-diamine. A second precursor monomer is selected from 4-acetoxybenzoic acid (ABA), 3-acetoxybenzoic acid, and 6-acetoxy-2-napthoic acid. A third precursor monomer is selected from trimesic acid (TMA), 1-hydroxypropane-1,2,3-tricarboxylic acid, 3,5-diacetoxybenzoic acid, 5-acetoxyisophthalic acid, [1,1'-biphenyl]-3,3',5,5'-tetracarboxylic acid, propane-1,2,3-tricarboxylic acid, 2,2-bis(acetoxymethyl)propane-1,3-diyl diacetate, benzene-1,3,5-triyl triacetate, dimethyl 3,3-bis(2-methoxy-2-oxoethyl)pentanedioate, and pyromellitic dianhydride. A fourth precursor monomer is selected from isophthalic acid (IPA), 4,4'-oxydibenzoic acid, [1,1'-biphenyl]-4,4'-dicarboxylic acid, benzoic acid, cyclohexane-1,3-dicarboxylic acid, cyclohexane-1,4-dicarboxylic acid, terephthalic acid, azelaic acid acid, sebacic acid, perfluoroazelaic acid, and perfluorosebacic acid. It is therefore contemplated that embodiments and examples of the invention disclosed herein may be modified in accordance, without limitation.

Example 1

ATSP/Solvent Spray Coating Technique

A. Materials and Oligomer Synthesis

The synthesis of a two part oligomeric system, one consisting of carboxylic end groups (hereinafter denoted with the reference character "C" or "C1") and the other consisting of acetoxy end groups (hereinafter denoted with the reference character "A" or "A1"), is described below. As a first step, hydroquinone diacetate (hereinafter HQDA) was synthesized by acetylation of hydroquinone (hereinafter HQ). In this case, 440 g of HQ was mechanically stirred in 850 mL of acetic anhydride (molar ratio of about 4:8.9) in a cylindrical vessel in an ice-water bath at 10° C. at which point 2-3 drops of sulfuric acid was added to catalyze the acetylation reaction. The solution temperature immediately increased to 80-85° C. due to the exothermic reaction. After allowing the solution to cool to room temperature, HQDA was precipitated out with distilled water. HQDA was then filtered, washed with water and dried in a vacuum oven at 70° C. for 12 hours. The reaction yield was above 98%. 4-acetoxybenzoic acid (hereinafter ABA) was produced in a manner analogous to HQDA with a molar ratio of 4:8.7 of 4-hydroxybenzoic acid (hereinafter HBA) mechanically stirred in a large excess of acetic anhydride at room temperature. Upon addition of 2-3 drops of sulfuric acid the temperature increased to 45° C. After allowing the solution to cool to room temperature, ABA was precipitated out with distilled water. ABA was then filtered, washed with water and dried in a vacuum oven at 70° C. for 12 hours. The reaction yield was above 95%.

The other monomers, trimesic acid (hereinafter TMA) and isophthalic acid (hereinafter IPA), were purchased from Alfa-Aesar and used without modification. It should be noted that this invention is not limited to the starting materials given in the examples, but is intended to include other monomers that would be obvious to one skilled in the art (e.g., terephthalic acid or oxydibenzoic acid could be used in place of isophthalic acid).

To produce carboxylic acid end-capped oligomer C1, 126 g TMA, 236.8 g HQDA, 149.4 g IPA, and 324 g ABA were mixed in a 2 L reactor flask. The flask was equipped with a three-neck head containing inlets for inert gas, a mechanical stirring bar, and a thermometer. The reactor was continuously purged with argon while immersed in a metal salt bath. The reactor was heated to 260° C. for 15 min to obtain a low-viscosity melt after which stirring was initiated. After refluxing for 1 h, the reflux condenser was replaced with a distillation condenser and collector flask. The temperature was increased to 280-285° C. while continuously stirring the melt. Acetic acid evolved as the reaction byproduct. The extent of the reaction was monitored by the amount of acetic acid collected. After an additional 3 h at 260° C., the reaction was stopped with 232 mL of acetic acid collected (theoretical 242 mL). Reaction yield of the C1 oligomer was about 560 g (approximately 97%). The C1 oligomer product, a translucent, viscous melt, was ground into a fine powder and purified by Soxhlet extraction in a 3:1 methanol-water solution followed by a distilled water rinse and drying overnight at 80° C. in vacuum.

For the acetoxy end-capped oligomer A1, 126 g TMA, 108 g ABA, 432.4 g HQDA and 99.6 g of IPA was used with the same procedure as above. 205 mL of acetic acid was collected after 3 hours at 260° C. (theoretical 208 mL) and reaction yield of the A1 oligomer was about 527 g (approximately 98%). Differential scanning calorimetry (DSC) and nuclear magnetic resonance (NMR) were used to confirm that both oligomers were of good quality and of appropriate molecular weight. On curing, the end groups of the oligomers react to form crosslinked ATSP.

For the carboxylic acid end-capped oligomer C2, 42 g TMA, 155.2 g HQDA, 132.8 g IPA, and 216 g ABA was used with same procedure as above. 150 mL of acetic acid was collected after 3 hours at 260° C. (theoretical 160 mL) and reaction yield of the C2 oligomer was about 378 g (approximately 96%). The C2 oligomer product, an opaque, viscous melt, was ground into a fine powder and purified by Soxhlet extraction in a 3:1 methanol-water solution followed by a distilled water rinse and drying overnight at 80° C. in vacuum.

For the acetoxy end-capped oligomer A2, 42 g TMA, 194.2 g HQDA, 66.5 g IPA, and 99.6 g of ABA was used with the same procedure as above. 140 mL of acetic acid was collected after 3 hours at 260° C. (theoretical 144 mL) and reaction yield of the A2 oligomer was about 259 g (approximately 98%). DSC and NMR was used to confirm that both oligomers were of good quality and of appropriate molecular weight. On curing, the end groups of the oligomers react to form crosslinked ATSP.

B. Catalyst Assisted Curing

Carboxylic acid end-capped and acetoxy end-capped oligomers (C1:A1 or C2:A2 at 1.1:1 weight ratio) were mixed with 0 to 2.5 wt % sodium acetate ($CH_3COONa$) as a catalyst. Blends were placed in hermetically sealed pans and analyzed with a TA Instruments 2910 Differential Scanning calorimeter. Changes in curing temperature are described by shifts in the change in heat flow characteristic of the cure reaction with regards to the onset of cure ($T_o$) and the peak cure temperature ($T_p$). Results are shown in Table 1 indicating that sodium acetate is effective for decreasing the cure temperature.

TABLE 1

Onset and peak cure temperatures for catalyst assisted curing of ATSP oligomers.

| $CH_3COONa$ (wt %) | C1A1 | | C2A2 | |
|---|---|---|---|---|
| | $T_o$ (° C.) | $T_p$ (° C.) | $T_o$ (° C.) | $T_p$ (° C.) |
| 0 | 264.4 | 313.2 | 248.1 | 297.5 |
| 0.15 | 262.8 | 302.2 | 242.6 | 285.4 |
| 0.3 | 257.9 | 286.8 | 233.8 | 270.1 |
| 0.6 | 257.6 | 285.0 | 229.1 | 263.9 |
| 1.22 | 247.9 | 276.8 | 220.7 | 255.3 |
| 2.5 | 235.6 | 271.7 | 214.7 | 246.2 |

C. Spray Coating Method

According to embodiments of the present invention, carboxylic acid end-capped and acetoxy end-capped oligomers (C1:A1, C1:A2, C2:A1, or C2:A2 at various weight ratios) may be mixed with a solvent at concentrations between 0.15-0.35 g of oligomers per mL of solvent, with a maximum concentration of 0.5 g/mL, along with lubricating or hardening additives (e.g., PTFE, polyimide, graphite, mullite, or $MoS_2$ powders), and held in stirred suspension at 80° C. According to an embodiment of the present invention, a solvent may be N-methylpyrrolidinone (NMP). A technique compatible with commercial wet spray processes utilizing compressed air, such as a high-volume low-pressure (HVLP) liquid spray gun, was developed and the oligomeric solutions were applied to a roughened metal substrate to form a coating film over the surface of the substrate.

Figure 13:
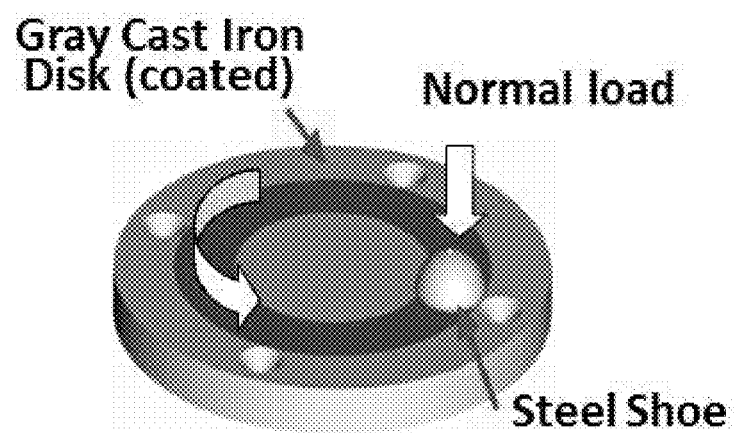
FIG. 13 illustrates examples of unidirectional tribological contact and oscillatory tribological contact to which embodiments of the present invention may be applied.
Figure 13:
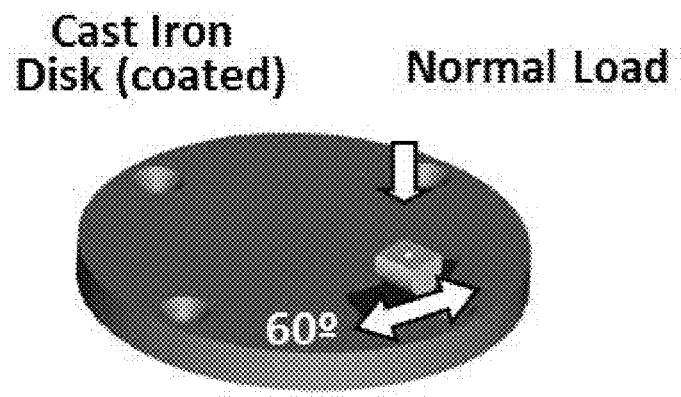
Figure 14:
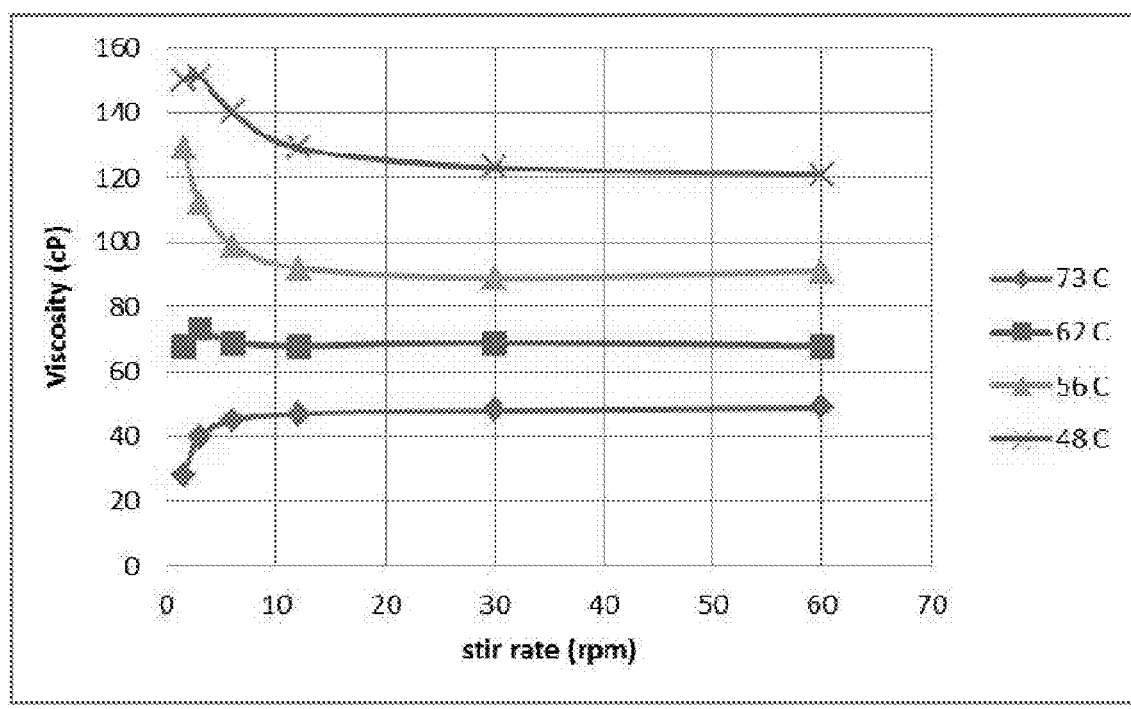
FIG. 14 illustrates viscosity of ATSP solutions according to embodiments of the present invention at several temperatures.

The viscosity of a solvent compatible with wet spray processes, according to embodiments of the present invention, may be less than 100 centipoise at wet spray process working temperatures, which may range over 50° C. to 80° C. Solvents prepared according to embodiments of the present invention exhibit the specified viscosity in accordance with specified concentrations and temperatures. FIG. 13 illustrates the viscosity of C1A1 in NMP at various temperatures, as a function of stir rate.

The surface geometry of a substrate compatible with wet spray processes, according to embodiments of the present invention, may be substantially roughened by abrasive blasting prior to the application of the oligomeric solution to form a coating film. Abrasive blasting may be performed by propelling an abrasive such as ceramic grit to a surface roughness of, for example, approximately 2 μm. Spray methods are at least insensitive to substrate roughness, and may be facilitated by a roughened substrate due to an increase in surface area so as to improve mechanical interlocking between a sprayed coating and the substrate. Insufficiently roughened substrates may lead to failure of the coating by delamination.

According to an embodiment of the present invention where the solvent is NMP, the solvent was then evaporated away at 202° C. and the coating film was cured in vacuum at 330° C. Curing induces the formation of crosslinks between the carboxylic acid end-capped oligomers and the acetoxy end-capped oligomers by reaction of the end groups. FIG. 1 illustrates a representative cure cycle for this process in a vacuum oven. Note that curing can also be performed in forced air or forced inert gas at cure times as low as 20 minutes at 240° C. by use of finely divided sodium acetate as a catalyst as described above. Sodium acetate can be introduced into the oligomer solution and co-sprayed along with the oligomeric constituents. This technique was found to be functionally insensitive to both inorganic and PTFE additive concentration.

Table 2 quantifies characteristics of crosslinked carboxylic acid end-capped oligomers and acetoxy end-capped oligomers in various combinations of oligomer species. Note that, depending on the number of moles of end groups present on each oligomer, the ratios of carboxylic acid end groups to acetoxy end groups may not be proportional to the ratios of oligomer molecular weight. The end group ratio (COOH:AcO) is recorded separately from the oligomer weight ratios.

The density of crosslink formation is derived from the average molecular weight between crosslinks ($M_c$). $M_c$ is inversely correlated to the density of crosslink formation.

TABLE 2

Quantified crosslinked ATSP

| Sample | Oligomer mass feed ratio (C#/A#) | Oligomer molar feed ratio (C#/A#) | COOH: AcO | Branching Coefficient ($X_n$) | $(M_c)_N$ (g/mol) |
|---|---|---|---|---|---|
| C1A1 | 1.105 | 1.000 | 1.00 | 0.1440 | 834.10 |
| C1A2 | 1.140 | 1.000 | 1.33 | 0.1051 | 1142.82 |
| C1A2+ | 1.243 | 1.087 | 1.45 | 0.1063 | 1129.92 |
| C1A2− | 1.029 | 0.900 | 1.20 | 0.1030 | 1166.12 |
| C1A2= | 0.857 | 0.750 | 1.00 | 0.1010 | 1189.21 |
| C2A1 | 1.080 | 1.000 | 0.75 | 0.1100 | 1117.30 |
| C2A1− | 1.224 | 1.133 | 0.85 | 0.1075 | 1117.30 |
| C2A1= | 1.440 | 1.333 | 1.00 | 0.1040 | 1091.91 |
| C2A1+ | 1.584 | 1.467 | 1.10 | 0.1020 | 1177.55 |
| C2A2 | 1.117 | 1.000 | 1.00 | 0.0718 | 1672.84 |

According to embodiments of the present invention, a solvent may alternatively be dimethylformamide (DMF) or dimethylacetamide (DMAc). When DMF is utilized as a solvent, it is evaporated away at 152° C. When DMAc is utilized as a solvent, it is evaporated away at 156° C.

Inorganic lubricating additives with particle diameters less than 40 μm such as graphite, molybdenum disulfide (MoS$_2$), boron nitride (BN), and carbon black were added to stirred oligomer solutions to concentrations ranging from 1 wt % to 25 wt % of oligomer mass in solution, were sprayable, and produced low roughness coatings after curing as above. Perfluorinated lubricating additives such as polytetrafluroethylene (PTFE), perflororoalkoxy (PFA), and fluorinated ethylene propylene (FEP) with particle diameters of less than 20 μm were likewise added into stirred suspension in oligomer solutions to concentrations ranging from 1 wt % to 15 wt % of oligomer mass in solution. A perfluorinated lubricating additive according to embodiments of the present invention may be Zonyl® PTFE manufactured by DuPont.

According to embodiments of the present invention, the solution may fail to achieve viscosity compatible with a wet spray process unless the lubricating additive is dispersed substantially uniformly in a stirred oligomer solution. The properties of different lubricating additives, as well as different grades of the same additive, may be conducive to, or may hinder, uniform suspension in a solution of carboxylic acid and acetoxy oligomers. Table 3 characterizes the behavior of additives according to embodiments of the present invention when in suspension in DMF, DMAc and NMP. Each additive listed as manufactured by Zonyl is a different grade of PTFE.

0.075 g of each additive was added to 10 mL of each of DMF, DMAc or NMP, equivalent to 5 wt % of solids of a 0.15 g/mL ATSP solution. The 20 mL scintillation vials containing the solvent and additive were then shaken vigorously and the interaction of solvent and additive observed by eye. The suspensions were characterized based on tendency to accumulate at meniscus (↑) or bottom of scintillation vial (↓) and the degree of agglomeration was rated on a scale of 0 to 5, with 0 being no visible macro agglomerates, 3 being a tendency towards a clear solution and up to millimeter-scale agglomerates, and 5 being instant clearing and up to centimeter-scale agglomerates.

TABLE 3

Summary of additive suspensions in DMF, DMAc and NMP

| | DMF | | DMAc | | NMP | |
|---|---|---|---|---|---|---|
| Additive | Accum. (↑ or ↓) | Agglom. (0-5) | Accum. (↑ or ↓) | Agglom. (0-5) | Accum. (↑ or ↓) | Agglom. (0-5) |
| Zonyl TE5069AN | ↑ | 2 | ↑↓ | 2 | ↑ | 3 |
| Zonyl MP1000 | ↑ | 4 | ↓ | 2 | ↑ | 4 |
| Zonyl MP1100 | ↓ | 1 | ↓ | 0 | ↓ | 2 |
| Zonyl MP1200SZ | ↑ | 4 | ↑ | 4 | ↑ | 4 |
| Zonyl MP1300 | ↑ | 4 | ↑ | 4 | ↑ | 4 |
| Zonyl MP1500 | ↑ | 5 | ↑ | 5 | ↑ | 5 |
| Aluminum silicate | ↓ | 0 | ↓ | 0 | ↓ | 0 |
| MoS$_2$ (<2 μm) | ↓ | 0 | ↓ | 0 | ↓ | 0 |
| Graphite (44 μm) | ↓ | 0 | ↓ | 0 | ↓ | 0 |

Figure 15:
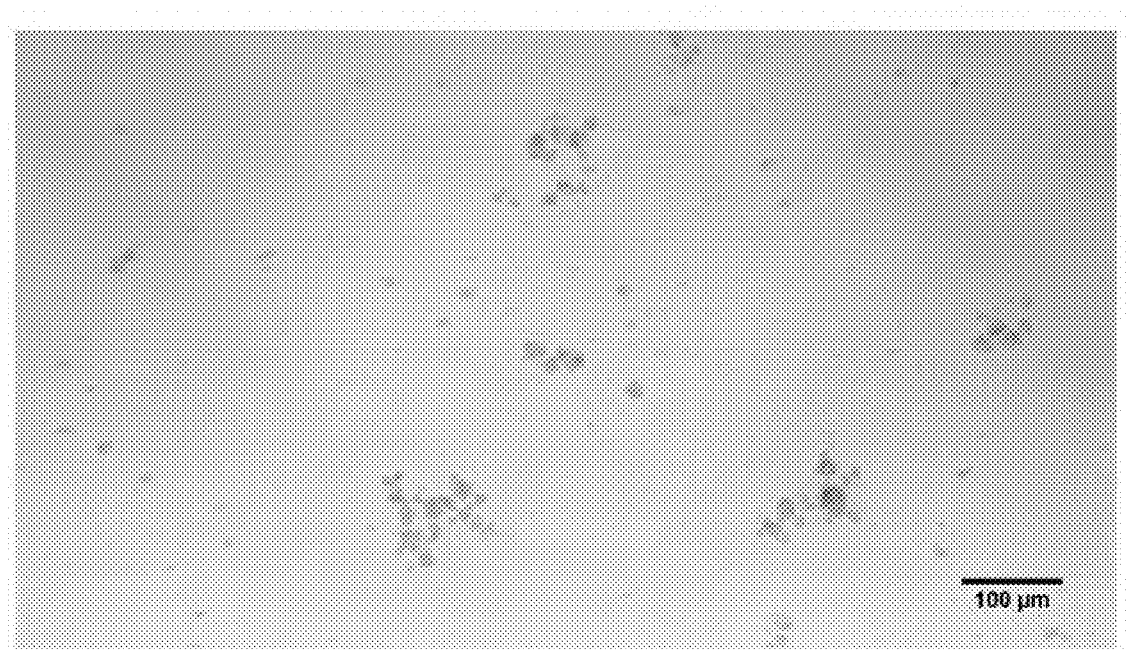
FIG. 15 illustrates a solution having a perfluorinated additive in suspension according to embodiments of the present invention at 10× magnification.

Each inorganic lubricating additive produces a substantially uniformly dispersed suspension free of visible agglomerates. Among the various grades of PTFE, only MP1100, in DMAc, produced a substantially uniform suspension free of agglomerates. Among the formulations of each grade of PTFE, Zonyl MP1100 is distinguished by a fine powder formulation; a particle size distribution wherein approximately ten percent of particles are smaller than 0.3 µm and approximately ninety percent of particles are smaller than 3 µm; and an average particle size of approximately 4 µm. FIG. 15 illustrates a suspension of Zonyl MP1100 in DMAc imaged at 10× magnification, demonstrating small (microscale) size and "open cluster" configuration of agglomerates. These characteristics exhibit substantially uniform dispersion in solution, and these characteristics may be well suited to producing substantially uniform and repeatable coatings in terms of surface roughness and lack of visible and obvious agglomeration.

Figure 16:
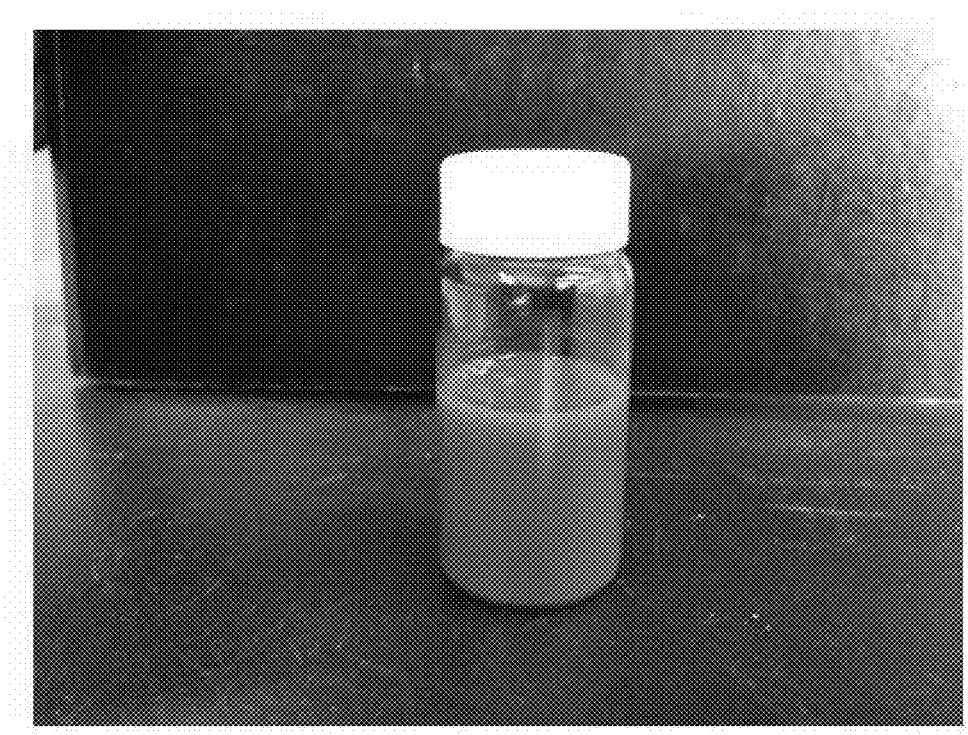
FIG. 16 illustrates an ATSP solution having a perfluorinated additive in suspension according to an embodiment of the present invention.
Figure 17:
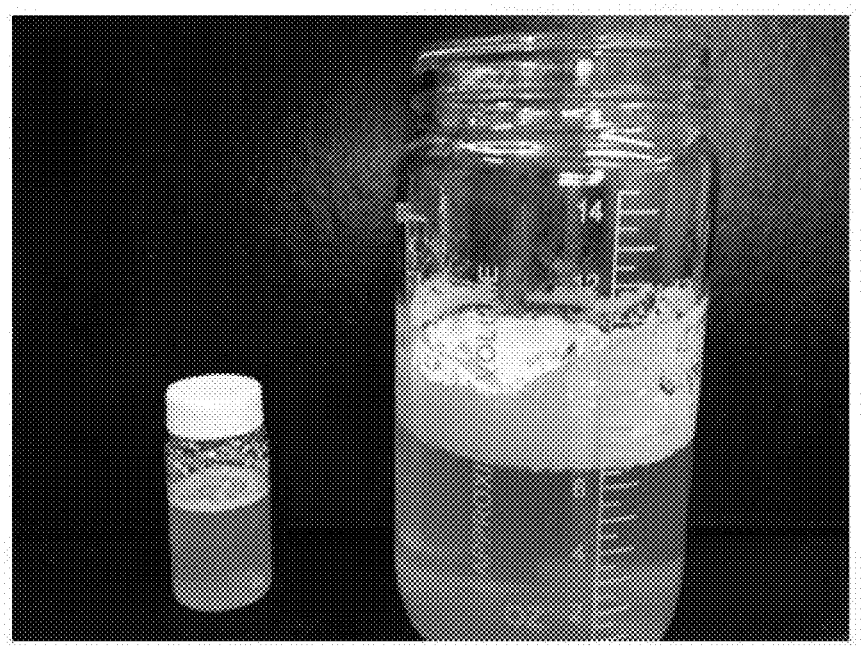
FIG. 17 illustrates an ATSP solution having a perfluorinated additive in suspension according to another embodiment of the present invention.

FIG. 16 illustrates a 0.35 g/mL ATSP/NMP solution stirred with 0.175 g (5 wt % of solids) added Zonyl MP1100. This oligomer solution does not exhibit any visible agglomerations of PTFE. FIG. 17 illustrates, to the left, a 0.15 g/mL ATSP/NMP solution stirred with 0.075 g (5 wt % of solids) added Zonyl TE5069AN, and, to the right, 200 mL of NMP with high shear magnetic stirring of 5 g of added Zonyl TE5069AN. In both samples, TE5069AN segregated to the meniscus of the NMP and was visibly heavily agglomerated. It is readily observed that TE5069AN is not amenable to uniform dispersion in oligomer solutions according to embodiments of the present invention.

Figure 18A:
FIGS. 18A and 18B illustrate the performance of ATSP coatings having perfluorinated additives in suspension according to embodiments of the present invention.
Figure 18B:

FIGS. 18A and 18B illustrate G2 Durabar cast iron substrates that were previously grit-blasted to 2 µm of surface roughness. The solutions were then sprayed at room temperature via a compressed-air driven HVLP liquid spray gun. Coatings were cured in accordance with the cure cycle of FIG. 1. FIG. 18A illustrates a coating produced with 0.35 g/mL ATSP solution with 5 wt % of Zonyl TE5069AN as an additive. This coating visibly exhibits high surface roughness and extreme levels of agglomeration and depletion of the Zonyl additive. Additionally, a highly inconsistent and stuttering spray was encountered during the attempt at production of this coating. FIG. 18B illustrates a coating produced with 5 wt % Zonyl MP1100 as an additive to the ATSP/NMP solution. This solution sprayed easily and consistently and produced a low roughness coating free of agglomerates visible by eye.

Figure 2A:
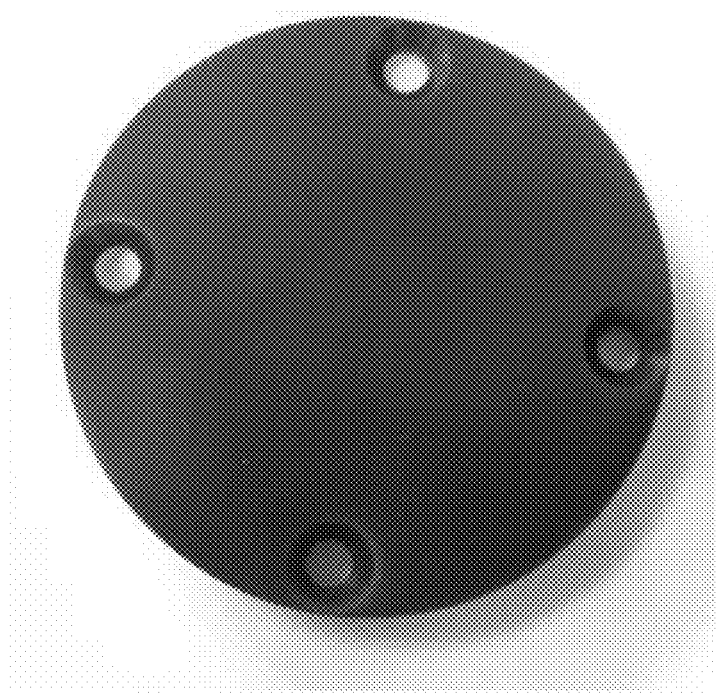
FIG. 2A illustrates an ATSP-coated disk coated by a spray coating method.
Figure 2B:
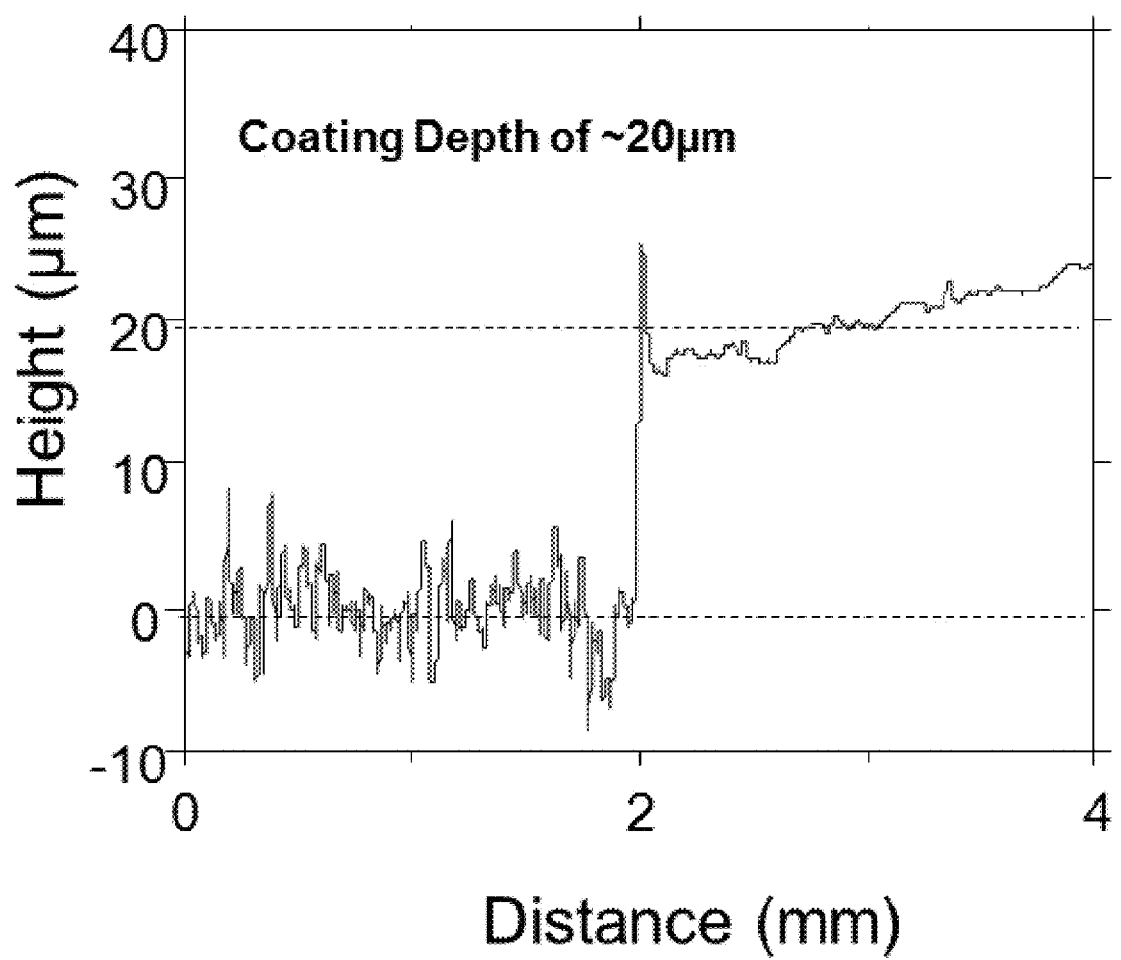
FIG. 2B illustrates a profilometry scan output from the disk of FIG. 2A.
Figure 5A:
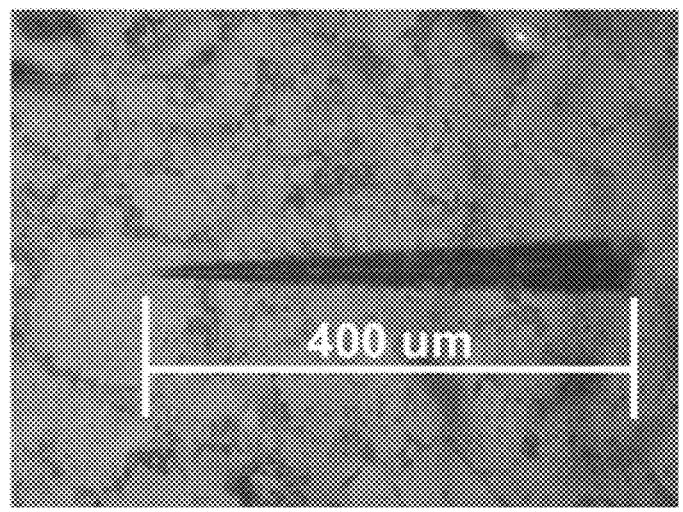
FIGS. 5A through 5I illustrates the results of scratch experiments conducted on PTFE-, PEEK-, and ATSP-coated cast-iron disks.
Figure 5D:
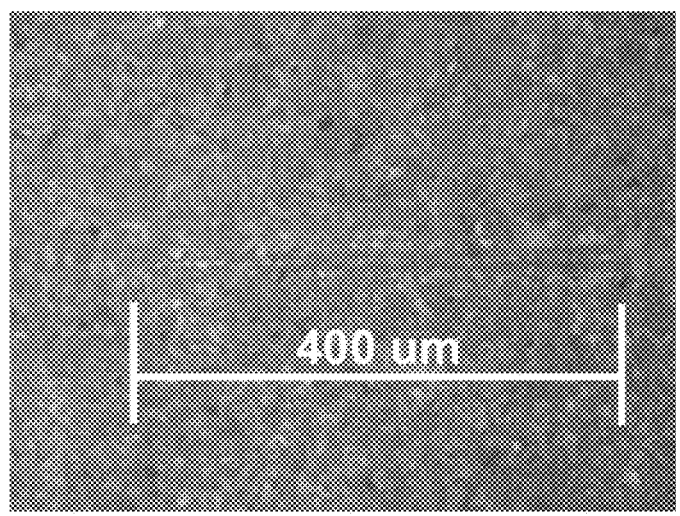
Figure 5G:
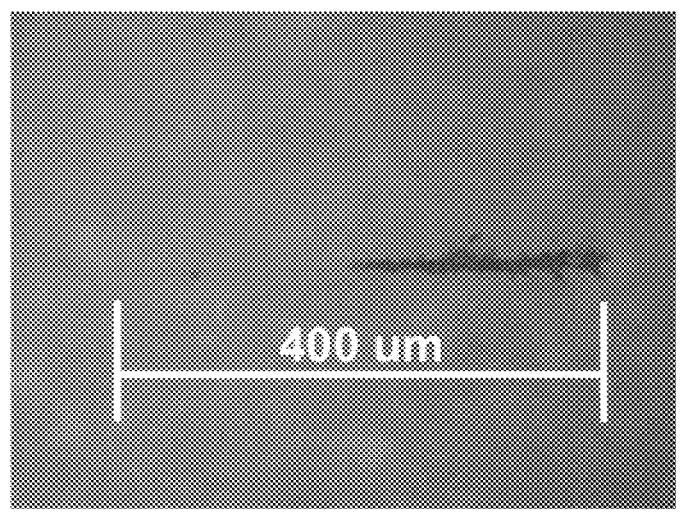
Figure 5B:
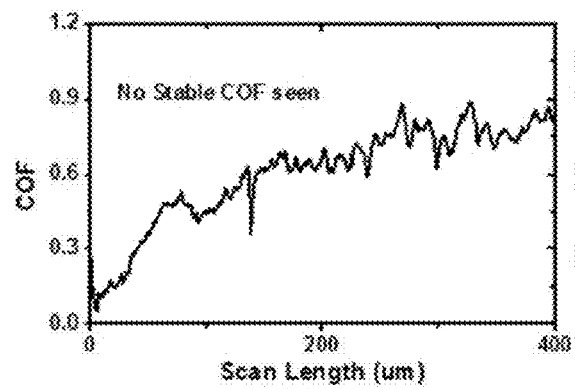
Figure 5C:
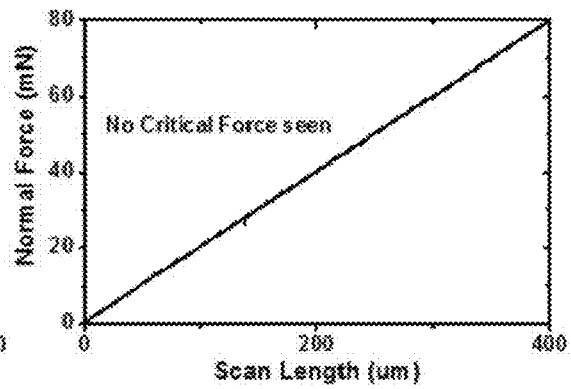
Figure 5E:
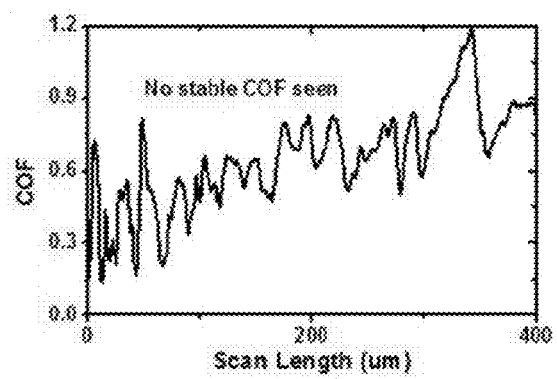
Figure 5F:
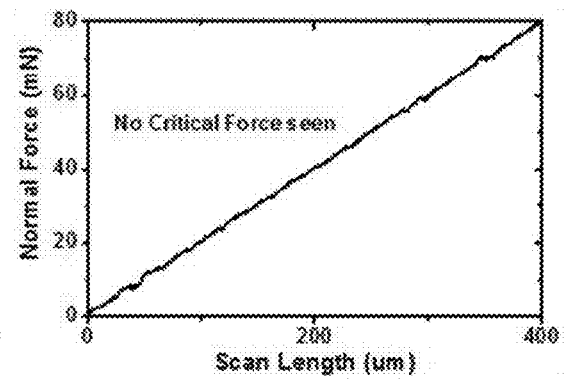
Figure 5H:
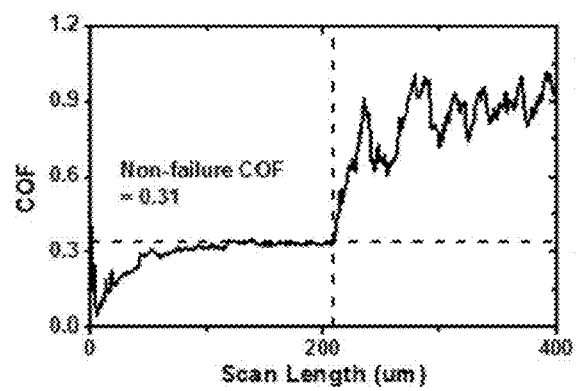
Figure 5I:
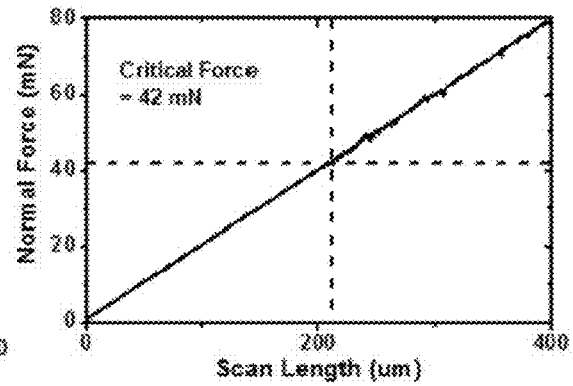

Note that ATSP is not water soluble, however NMP has several desirable properties such as low volatility, low flammability and relatively low toxicity and is already being used as a solvent to apply commercial polymeric wear coatings (Thus its potential environmental impact is similar or better than existing commercial coatings). FIG. 2A shows an image of a spray-coated disk coated with a film with a thickness of 20 microns, as indicated by the profilometry scan output for the disk illustrated in FIG. 2B. The ATSP coatings can be consistently produced in a 20-40 microns range with ~5 micron standard deviation, a typical sample roughness is 0.4±0.15 microns.

Example I

Oligomers C1 and A2 were blended in equimolar proportions, which is a mass ratio of 1934:1692, in NMP with 5 weight percent Zonyl MP1100. As C1 possesses 4 moles of carboxylic acid functional end groups, while the A2 oligomer possesses 3 moles of acetoxy functional end groups, this yields an excess of carboxylic acid functional end groups in the resin, specifically at a ratio of 1.52:1 carboxylic acid:acetoxy functional end groups. The oligomer solution with fluoroadditive was then sprayed onto cast iron substrates that were previously grit blasted with a 40 mesh garnet grit to $R_a$=2 µm of roughness. Coated substrates were then cured via a convection oven with a peak cure temperature of 270° C. for 30 minutes.

Example II

Oligomers C2 and A1 were blended in equimolar proportions, which is a mass ratio of 1890:1750, in NMP with 5 wt % Zonyl MP1100. As C2 possesses 3 moles of carboxylic acid functional end groups, while the A1 oligomer possesses 4 moles of acetoxy functional end groups, this yields an excess of acetoxy functional end groups in the resin, specifically at a ratio of 1:1.23 carboxylic acid:acetoxy functional end groups. The oligomer solution with fluoroadditive was then sprayed onto cast iron substrates that were previously grit blasted with a 40 mesh garnet grit to $R_a$=2 µm of roughness. Coated substrates were then cured via a convection oven with a peak cure temperature of 270° C. for 30 minutes.

Figure 8A:
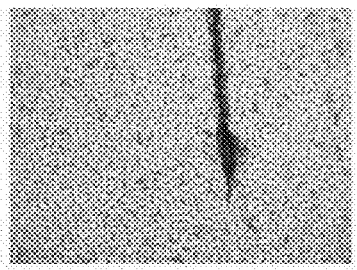
FIGS. 8A through 8C illustrate ATSP coatings imaged by transmitted light at 20× magnification.
Figure 8B:
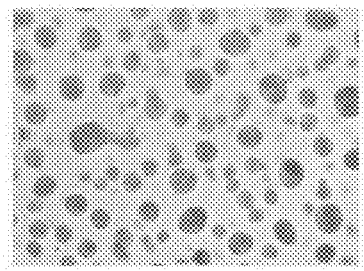
Figure 8C:
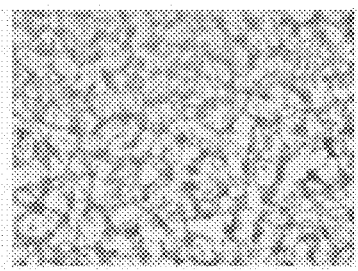

Cured coatings of 20 µm thickness comprising C1A2 with 5 wt % Zonyl MP1100 fluoroadditive and C2A1 with 5 wt % Zonyl MP1100 fluoroadditive evidenced significant intrinsic texturing. FIGS. 8A through 8F show a distinct segregation between an amorphous and transparent phase and more opaque and more highly ordered phases. Segregation of ordered and amorphous phases in the coating is produced in-situ by the advancement of the molecular weight of the crosslinkable oligomers towards a network structure. Internal segregation and thereby surface morphology may be controlled through selection of oligomer chemistry and selection of cure cycle: as seen in FIGS. 8A through 8C, illustrating ATSP coatings imaged by transmitted light at 20× magnification, this segregation is altered substantially between the 270° C. cure frame and the 330° C. cure frame. FIG. 8A illustrates a C1A2 coating produced by a 270° C. cure cycle; FIG. 8B illustrates a C2A1 coating produced by a 270° C. cure cycle; and FIG. 8C illustrates a C2A1 coating produced by a 330° C. cure cycle.

Figure 8D:
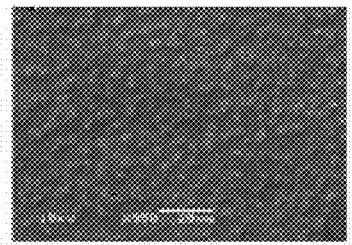
FIGS. 8D through 8F illustrate scanning electron microscopy images of an ATSP coating before and after a sliding high pressure tribometer experiment.
Figure 8E:
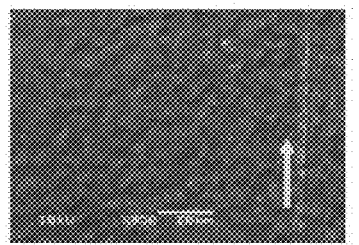
Figure 8F:
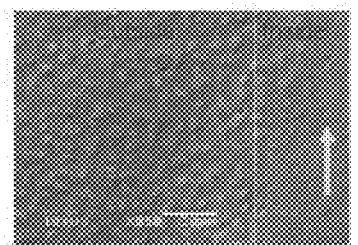
Figure 9A:
FIGS. 9A through 9F illustrate micrographs of six coatings after unidirection high pressure tribometer experiments.
Figure 9B:
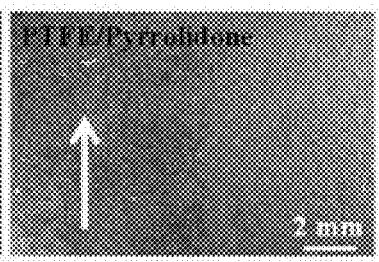
Figure 9C:
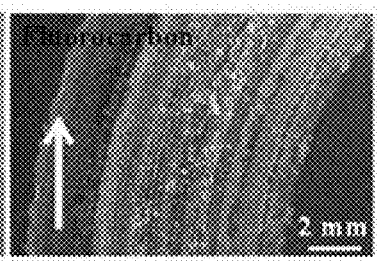
Figure 9D:
Figure 9E:
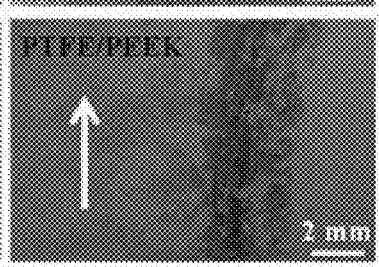
Figure 9F:
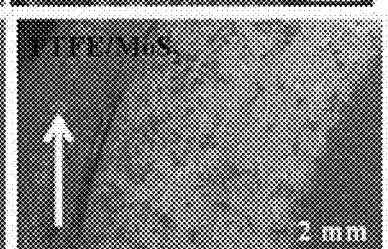
Figure 10A:
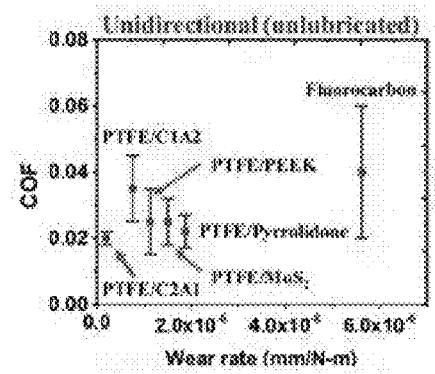
FIGS. 10A through 10D illustrate the wear rates and coefficients of friction exhibited by a selection of coatings after unlubricated and lubricated unidirectional and oscillatory tribological experiments.
Figure 10B:
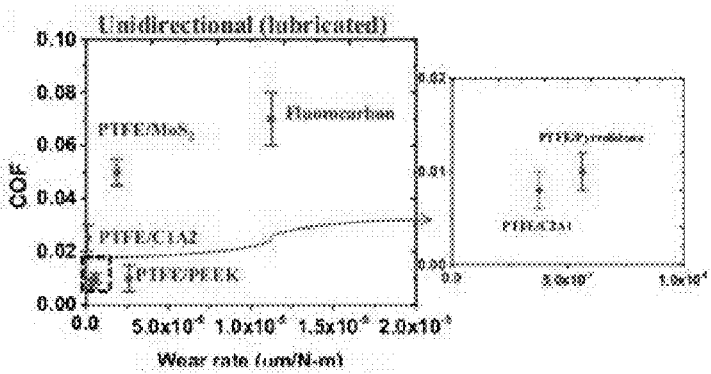
Figure 10C:
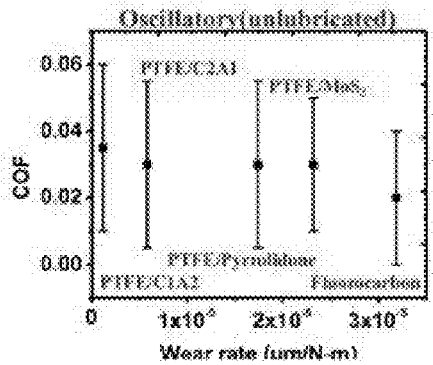
Figure 10D:
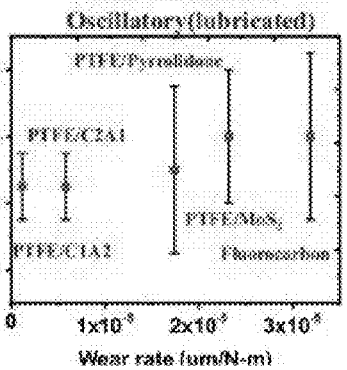

FIGS. 8D through 8F illustrate scanning electron microscopy images of C1A2 with 5 wt % PTFE processed at 270° C. for 30 minutes. FIG. 8D illustrates the coating prior to a sliding high pressure tribometer experiment. FIG. 8E illustrates the coating of FIG. 8D after a sliding high pressure tribometer experiment, showing blunting of surface texture. FIG. 8F illustrates the transition from wear track to virgin material, where the area inside of the wear track evidences sacrificial debris field formed from surface segregation. Segregation produces an intrinsic surface texture which may be tailored for applications in sliding contact. A texture of approximately micron scale may allow trapping of lubricant in the valleys of the texture such that wear occurs only at the peaks of the texture, which happens at a very slow rate. Segregation between amorphous and ordered regions manifests as coating surface texture which enables both controlled formation of sacrificial debris films (as seen in FIGS. 8E and 8F) and micro-reservoirs.

In addition, ATSP exhibits very good adhesion to different metal substrate surfaces. For example, in peel strength experiments on copper, copper sputtered with zinc and copper sputtered with nickel surfaces, it was found that the peel strength of ATSP coatings on copper sputtered with zinc was about three times the peel strength of ATSP coatings on nickel and copper surfaces. In other tests, the lap shear strength of ATSP coatings on different kinds of titanium surfaces was examined and the results showed that ATSP coatings have adhesion strength of 2000-3000 psi on titanium surfaces, which is comparable to the strength of epoxy on metal surfaces. So it is believed that the poor adhesion problem for some coatings does not exist for the ATSP coating on metal surfaces.

D. Tribological Data

Tribotesting was performed using a High Pressure Tribometer (HPT) under wear conditions that simulate an aggressive air-conditioning scroll compressor (summarized in Table 4). It was found in the past that the results from the HPT correlate well with field data performed by industry. The spray coated cast iron substrates were tested under two conditions, as illustrated in FIG. 13:

(I) unidirectional high speed sliding conditions, typical of the scroll component contact, and (II) small oscillation fretting motions, simulating the thrust bearing in the compressor.

In both cases, constant load wear type experiments were performed to determine the wear rate and coefficient of friction (COF), as compared to scuffing load (stepping up the load) experiments to determine the threshold to catastrophic failure.

TABLE 4

Experimental tribological conditions simulating aggressive compressor conditions.

| Conditions | I: Unidirectional | II: Fretting |
|---|---|---|
| Sliding speed (m/s) | 4.0 | 4.5 Hz oscillation, 1.5 mm translation, 13.5 mm/s |
| Normal load (N) | 445 | 445 |
| Pin type | 10 mm compressor shoe | 3.2 mm CI pin |
| Test duration (min) | 30 | 30 |
| Chamber temperature (° C.) | 90 | 90 |

The ATSP C1A1 and C2A2 coatings performed well under unidirectional conditions and the COF was very stable and consistent (Table 5). In several cases, the unidirectional results are on par with state-of-the-art commercially available coatings (Table 6). And in a recent extended duration testing of 3 hours (simulating durability or life experiments), the wear rate for C2A2 coatings declined significantly and maintained a shallow 15 μm wear track, indicating it had reached a steady state.

TABLE 5

COF and wear data for various ATSP spray coated disks under unidirectional conditions.

| Coating | Duration of Test (min) | COF | Wear Depth (μm) | Wear Rate (mm$^3$/[N*m]) |
|---|---|---|---|---|
| C1A1 | 30 | 0.04 | 14 | 5.45E−6 |
| 5 wt % PTFE | 30 | 0.02 | 13 | 4.45E−6 |
| C1A1 5 wt % MoS$_2$ | 30 | 0.05 | 13 | 2.70E−6 |
| C2A2 | 30 | 0.08 | 17 | 2.82E−6 |
| 5 wt % PTFE | 30 | 0.07 | 6 | 8.93E−7 |
|  | 30 | 0.07 | 10 | 9.03E−7 |
|  | 116 | 0.08 | 5 | 2.12E−7 |
|  | 180 | 0.09 | 15 | 8.09E−7 |

TABLE 6

COF and wear data for various commercial polymeric coated disks under unidirectional conditions.

| Coating | Duration of Test (min) | COF | Wear Rate (mm$^3$/[N*m]) |
|---|---|---|---|
| DuPont ® 958-303 (PTFE/Resin) | 30 | 0.05 | 1.54E−6 |
| DuPont ® 958-414 (PTFE/Resin) | 30 | 0.04 | 1.23E−6 |
|  | 180 | 0.05 | 2.70E−7 |
| Fluorolon ® 325 (PTFE/MoS$_2$) | 30 | 0.04 | 3.76E−7 |
|  | 180 | 0.13 | 1.15E−6 |
| 1704 PEEK/PTFE | 30 | 0.08 | 1.63E−5 |
| 1707 PEEK/Ceramic | 30 | 0.09 | 6.73E−6 |

The C1A1 and all commercial coatings failed before the full duration of the fretting test with much deeper wear tracks (Table 7). However, ATSP's low crosslink density formulation (C2A2 with 5 wt % PTFE) survived the 30-minute test with low COF values and relatively shallow wear tracks. When subjected to a 3-hour durability test, the ATSP-based coatings again survived where commercial coatings based on PEEK and PTFE did not.

TABLE 7

COF and wear data for various ATSP spray coated disks under fretting conditions.

| Coating | Duration of Test (min) | COF | Wear Depth (μm) | Wear Rate (mm$^3$/[N*m]) |
|---|---|---|---|---|
| C1A1 | 23 | 0.14 | 55 | N/A |
| 5 wt % PTFE | 29.5 | 0.14 | Deep | N/A |
| C1A1 5 wt % MoS$_2$ | 2 | 0.20 | 40 | N/A |
| C2A2 | 30 | 0.10 | 10 | 5.65E−4 |
| 5 wt % PTFE | 30 | 0.09 | 10 | 5.02E−4 |
|  | 30 | 0.09 | 8 | 1.50E−4 |
|  | 30 | 0.08 | 15 | 3.00E−4 |
|  | 180 | 0.09 | 30 | 9.48E−5 |

ATSP coatings on cast iron substrates were additionally observed to evidence an extraordinarily high degree of elastic recovery as compared to state-of-art polymeric coatings. Polymer-coated cast iron substrates were scratched by a 4.3 μm conispherical indenter tip at a ramp rate of 2 mN/s and a translation speed of 10 μm/s in a Hysitron TI-950 Triboindenter. FIG. 3 illustrates the results of these scratch experiments performed on PTFE-coated, PEEK-coated, and ATSP-coated disks. Experiments to 5 and 15 mN were carried out followed by a retrace along the scratch path to identify elastic versus plastic deformation. Post-scan trace was carried out at 0.2 mN to determine the elastically recovered profile. FIGS. 4A and 4B illustrate total plastic versus elastic deformation at a maximum load of 5 mN and 15 mN, respectively; FIG. 4C illustrates percent elastic recovery as a function of maximum load; and FIG. 4D illustrates the COF during this process. ATSP coatings demonstrated an almost complete elastic recovery when compared to other commercially available polymeric coatings while still retaining a low and stable COF. Note that polymers with better elastic recovery display better frictional behavior due the smaller real contact area.

ATSP-based coatings in scratch experiments carried to normal loads of 80 mN while maintaining the above translation and ramp parameters, as illustrated in FIG. 5, evidenced a clear regime below a certain critical force wherein nearly complete elastic recovery is observed.

FIGS. 9A through 9F illustrate reflected light optical micrographs of six coatings following a lubricated and unidirection high pressure tribometer experiment. Dark patches of retained lubricant are observed in small reservoirs on the coating surfaces.

FIGS. 10A through 10D illustrate the results of sliding contact tribological experiments which were conducted to simulate a swash-plate type automotive compressor via a high pressure tribometer. This was conducted in a pin-on-disk configuration where the uncoated 52100 steel pin was held stationary and the coated disks rotated. These experiments were conducted with a chamber temperature of 90° C. with a chamber pressure of 0.3 MPa of HFO-1234yf refrigerant. Experiments were conducted in a matrix encompassing lubricated and unlubricated as well as oscillatory and unidirectional states. Contact from the 10 mm diameter pin was maintained at a normal force of 445 N. Wear tracks were observed by profilometry and the wear rate was calculated by integration of the track area times wear depth divided by normal force times sliding distance. The standard deviation of the coefficient of friction of ATSP coatings declined while overall coefficient of friction remained low during lubricated oscillatory experiments, indicating a synergistic effect between coatings and boundary lubrication. Coatings processed at 270° C. cure frame exhibited wear rates significantly below those of a broad swath of extant commercial coatings.

In all cases, ATSP-based coatings outperformed state-of-art polymeric coatings. Differentiation between acetoxy-biased and carboxylic acid-biased resins was observed. Acetoxy-biased resin C2A1 with fluoroadditive evidenced a lower wear rate in unidirectional sliding contact (both lubricated and unlubricated) as compared to carboxylic acid-biased resins and compared to resins which had equimolar ratio of carboxylic acid and acetoxy functional caps. Carboxylic acid-biased C1A2 with fluoroadditive evidenced a lower wear rate than acetoxy-biased and non-biased resins in oscillatory sliding contact. Thus, solvent-borne coatings with a COOH:AcO ratio of less than 1 (C2A1) are effective against both unidirectional motions in tribological contact and scratch resistance, whereas coatings with a COOH:AcO of greater than 1 (C1A2) are effective against oscillatory motions.

Coatings of ATSP were examined via an instrumented scratch experiment on a TI-950 Hysitron Triboindenter with 3D Omniprobe. A 4.3 μm conospherical indenter tip was used to apply scratches. A ramped load with retrace experiment was performed wherein the initial surface profilometric was scanned from initial position to a lateral displacement of 400 μm a very low 0.2 mN at a 10 μm/s transversal. A ramped load of 2 mN/s from 0.2 mN to 80 mN was then applied from the 400 um lateral position as the tip traversed back to the starting point at 10 μm/s. A post-scratch profilometric scan from the starting point to the 400 μm position at 0.2 mN, 10 μm/s was then automatically conducted. This experiment allowed observation of material's scratch resistance in terms of elastic versus plastic deformation via the relationship of the reported normal position of the conospherical tip measured continuously during scratch experiment at a normal resolution of 0.1 nm and a lateral resolution of 50 nm. Ratio of elastic to total deformation expressed as a percent was determined by $100 \times (B-C)/(B-A)$ where A is the normal position at a given lateral position during initial profilometric scan, B is the normal positions during ramped load phase, and C is the normal positions during the final profilometric scan.

Figure 11A:
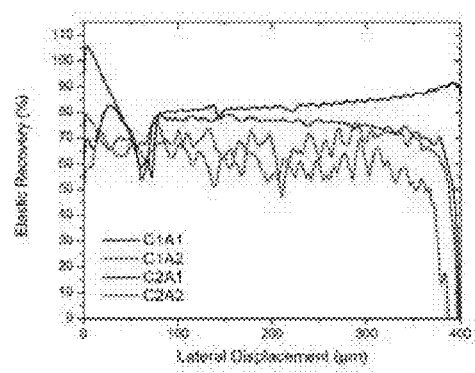
FIGS. 11A and 11B illustrate the elastic recovery and coefficient of friction exhibited by several ATSP coatings, following Hysitron Triboindenter scratch experiments.
Figure 11B:
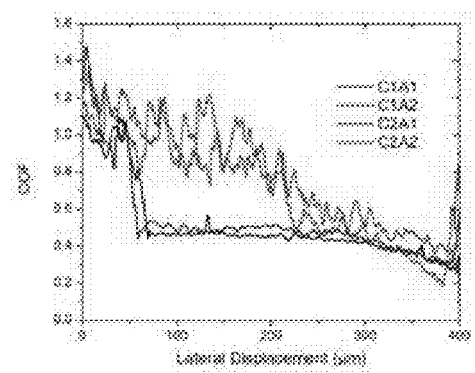

FIG. 11 shows representative elastic recovery and coefficient of friction for neat (i.e., without a lubricating additive) ATSP resins C1A1, C1A2, C2A1, and C1A2. Note that ramp load direction here is right to left 0 to 80 mN. Transitions in the coefficient of friction curves correspond well to transitions in the elastic recovery curve particularly for the cases of neat C1A1 and C2A1. These transitions are from a non-penetrative translation over the coating surface characterized by a high level of elastic recovery to a plowing type of permanent deformation. ATSP-based coatings exhibited a higher degree of elastic recovery than any other coating examined as seen in Table 8, and, in this sense, exhibited a superior scratch resistance.

TABLE 8

Summary of commercial coating scratch properties. N/A indicates coating did not evidence a distinct critical force or stable COF prior to critical force.

| Coating Type | Test Conditions | Critical Force (mN) | Non-failure COF | Eleastic Recovery at 30 mN (%) |
|---|---|---|---|---|
| C1A1-330C | 80 mN/400 μm | 69-80+ | 0.3-0.33 | 92-98 |
| C1A1 + 5 wt % PTFE-330C | 80 mN/400 μm | 45-48 | 0.34 | 90-95 |
| ABS | 80 mN/400 μm | N/A | N/A | 20-30 |
| PC | 80 mN/400 μm | 56 | 0.96 | 40-50 |
| PTFE | 80 mN/400 μm | N/A | N/A | 5-10 |
| PAI/PTFE | 80 mN/400 μm | N/A | N/A | 50-65 |
| DGEBPA Epoxy | 80 mN/400 μm | N/A | N/A | 40-60 |
| Kapton | 80 mN/400 μm | 50 | 0.50 | 60-86 |
| P84 | 80 mN/400 μm | 38 | N/A | 40-60 |
| PEEK/PTFE | 80 mN/400 μm | N/A | N/A | 15-20 |
| Fluorocarbon | 80 mN/400 μm | N/A | N/A | 10-20 |

Figure 12A:
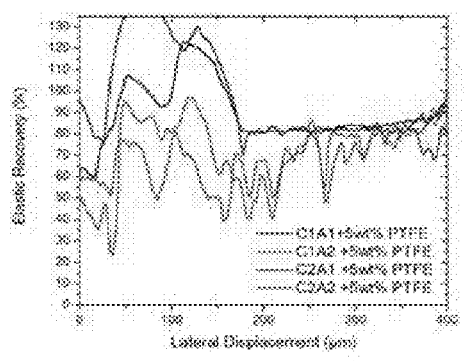
FIGS. 12A and 12B illustrate the elastic recovery and coefficient friction exhibited by several ATSP coatings with bound fluoroadditive, following Hysitron Triboindenter scratch experiments.
Figure 12B:
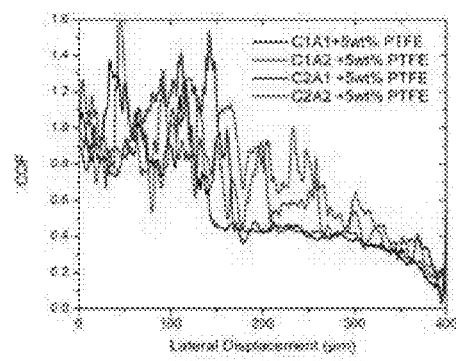

An unexpected result in terms of scratch resistance was observed where acetoxy-biased C2A1 demonstrated equivalent elastic recovery to C1A1, as can be seen from FIG. 11. This is differentiated from the C1A2 resin, which has equivalent crosslink density but instead a preponderance of carboxylic acid caps and from C2A2 which has a substantially lower crosslink density than any other ATSP resin. These results carry over to the case of ATSP with 5 wt % fluoroadditive bound within the coating resins after a cure of 270° C. as seen in FIG. 12.

Example 2

ATSP Powder-Based Coatings

A. Materials and ATSP Powder Synthesis

Figure 6A:
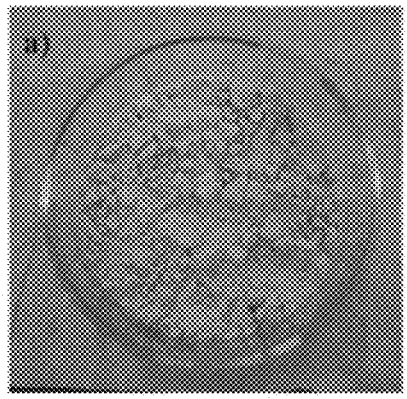
FIG. 6A illustrates the appearance of cured ATSP powder according to embodiments of the present invention.
Figure 6B:
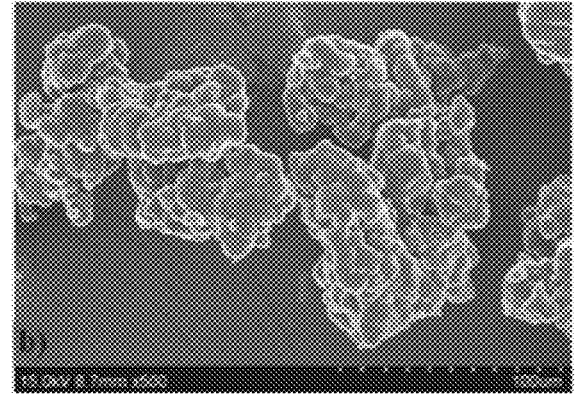
FIG. 6B illustrates a scanning electron microscope image of individual particulates of the cured ATSP powder of FIG. 6A.

To synthesize cured ATSP powders, TMA, HQDA, IPA, and ABA (molar ratio of 4:11:5:8 respectively) was charged into a 3-neck reactor with Therminol-66 at concentrations between 0.10 and 0.35 kg/L, and was continuously purged with nitrogen. The monomer mixture was stirred using mechanical stirring during the reaction. The monomers were then refluxed at 270-285° C. for 30 min. The apparatus was switched to acetic acid removal and the temperature increased to 270° C. The reaction was carried out at this temperature until 90% of the theoretical yield of the by-product (acetic acid) was captured. The temperature was increased to 320-330° C. for the final 5 hrs. The reaction product was then filtered and washed with acetone and then finally purified using Soxhlet extraction with acetone for 24 hours. FIG. 6A shows a photograph of the ATSP powder material and FIG. 6B shows a scanning electron microscopy (SEM) image of the resulting particulates, whereby the size distribution can be controlled by such factors as the stir speed, monomer concentration, etc.

A process for producing partially cured ATSP powders was carried out as above except that the reaction was carried out to only 35% degree of by-product acetic acid removal. The reaction product was then filtered and washed with acetone and then finally purified using Soxhlet extraction with acetone for 24 hours.

A lower temperature cure process was achieved by utilizing sodium acetate as a catalyst for transesterification. TMA, HQDA, IPA, and ABA (molar ratio of 4:11:5:8 respectively) and 2.5 wt % sodium acetate was charged into a 3-neck reactor with Therminol-66, which was continuously purged with nitrogen. The monomers were refluxed for 60 min and the apparatus was switched to acetic acid removal. The reaction was carried out at this temperature until 45% of the theoretical yield of the by-product (acetic acid) was captured. The reaction product was then filtered and washed with acetone and then finally purified using Soxhlet extraction with acetone and ethanol for 24 hours. The powder was then subjected to a heating cycle intended to promote a solid-state ITR process to produce a fully cured powder. ATSP powder was heated to 330° C. under vacuum for 4 hours and removed. Themogravimetric analysis (TGA) demonstrates a much lower degree of off-gassing for ATSP cured product through 500° C.

B. Compression Sintered Coatings

One route to produce coatings from ATSP powder is to utilize consolidation and sintering by application of heat and pressure. Fully cured ATSP powder as produced above was mechanically blended with lubricating additives such as with particle diameters less than 40 μm such as graphite, molybdenum disulfide ($MoS_2$), boron nitride (BN), and carbon black as well as perfluorinated lubricating additives such as polytetrafluroethylene (PTFE), perflororoalkoxy (PFA), and fluorinated ethylene propylene (FEP) with particle diameters of less than 20 μm at a weight ratio of 19:1. This was then evenly deposited onto a roughened aluminum substrate to form a coating film, and heated to 330° C. for 4 hours and 0.7 MPa pressure applied via a Carver hot press.

C. Thermal/Plasma Spray Coatings

Another method for producing ATSP coatings is through the use of thermal/plasma spray techniques. Partially cured ATSP powder was initially passed through a ~60 mesh sieve to remove any large polymer particles. The powder was then loaded into the Twin 10 feeder hopper with a Eutectic Terodyn 3000 combustion spray gun used for these trials. An initial set of parameters was chosen based on prior experience with depositing liquid crystal polymer powders:

Spray Distance: 3 inches
Air Back Pressure:
Acetylene pressure/flow: 15 psi/15 FMR
Oxygen pressure/flow 50 psi/13 FMR
Argon Carrier pressure/flow: 4 bar/10 FMR
Traverse Rate: 100% (2 inches/sec)

The first two samples in Table 9 were for the purpose of generating splats. However, very little in-flight melting occurred and the substrate pre-heat temperature was insufficient to promote splatting. Attention was then focused on generating coatings whereby additional passes of the spray torch are needed to heat the polymer during deposition. The following parameters were chosen and then varied as shown in Table 9 to influence flame temperature, particle velocity, and substrate temperature. High carrier flow rates were also used to create high shear upon impact. Temperatures of the deposited coating were recorded using an infrared pyrometer with emissivity set to 0.95.

TABLE 9

Partially cured ATSP sample summary (combustion spraying).

| Sample Number | Pre-Heat (° F.) | Air Shroud (psi) | Cycles | Powder Wheel RPM % | Coating Temp (° F.) | Thickness (mils) | Comment |
|---|---|---|---|---|---|---|---|
| 0923-01 | 110 | 60 | 1 | 5 | NA. | Splats | No splats |
| 0923-02 | 270 | 60 | 1 | 5 | NA. | Splats | No splats |
| 0923-03 | 250 | 60 | 3 | 30 | 450 | 10 | Poor melting |
| 0923-04 | 325 | 60 | 2 | 30 | 550 | 7 | Some melting |
| 0923-05 | 320 | 50 | 2 | 30 | 420 | 6.5 | Poor melting |
| 0923-06 | 320 | 45 | 2 | 30 | 500 | 6 | Poor melting |
| 0923-07 | 450 | 45 | 1 | 30 | 520 | 3 | 150% Traverse Speed. Some Melting |
| 0923-08 | 450 | 45 | 3 | 30 | 520 | 7 | 150% traverse. |
| 0923-09 | 550 | 45 | 2 | 30 | 600 | 5.5 | Some melting |
| 0923-10 | 550 | 20 | 1 | 30 | >600 | 2 | Degraded |
| 0923-11 | 650 | None | 1 | 30 | 380 | 1.5 | No Flame—Powder Only. Coating is WHITE. Post-heated to 450 F., coating turned BLACK |
| 0923-12 | 600 | 50 | 2 | 30 | 580 | 5 | Some Melting |

Figure 7:
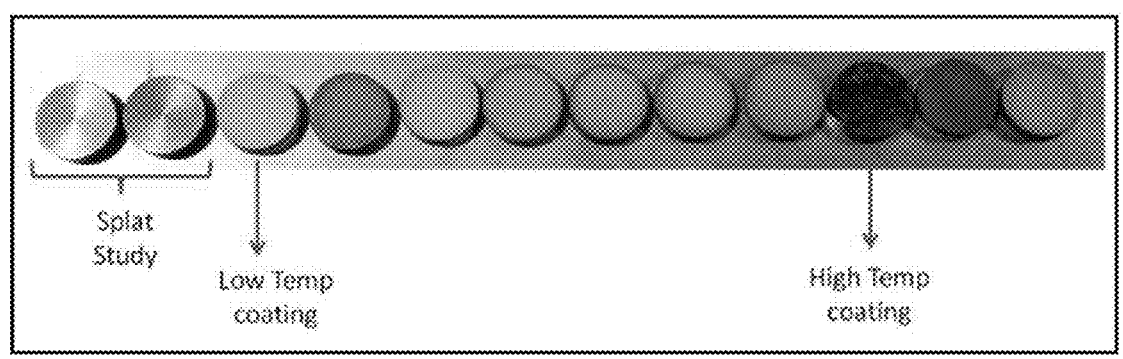
FIG. 7 illustrates twelve ATSP-coated substrates coated by a thermal spraying method according to embodiments of the present invention, where first order parameters were varied in the coating method for each substrate.

The partially cured ATSP did not exhibit melt flow behavior like a traditional thermoplastic polymer. Coatings were not completely coalesced although some particle melting was observed under a stereomicroscope. At low temperatures (clear coatings), the ATSP powder does not melt uniformly, leading to a coating that is not fully reacted. The polymer is sensitive to thermal-oxidation as witnessed by the discoloration at coating temperatures above 500° F. It was difficult preheating the substrate to temps above 450° F. and keeping the substrate at that temperature just prior to deposition due to substrate cooling effects. These first order parameters produced a wide variety of results, indicating that they are indeed the critical parameters to optimize, and also providing a processing window to be further refined. FIG. 7 shows the appearances of the 12 substrates after thermal spraying, arranged from left to right in the order of Table 6.

A low temperature flame may be utilized in the thermal spraying process to prevent degradation to the polymer in conjunction with using a better, higher temperature heater assembly that can heat and insulate the substrate to temperatures of 600 F or greater. Improved particle melting and coalescence may result. The properties of the ATSP polymer such as molecular weight, and crosslink density may be modified such that the polymer may exhibit greater melt flow behavior. Improved particle melting and coalescence may result by decreasing the melting temperature (i.e. a greater processing window between melting temperature and onset of degradation).

Example 3

ATSP Melt Processible Oligomers and Coatings

A. Oligomer Synthesis

For the carboxylic acid end-capped oligomer C8, 42 g TMA, 46.6 g HQDA, 39.9 g IPA, and 129.7 g ABA was used with same procedure as above. 64 mL of acetic acid was collected after 3 hours at 260° C. (theoretical 68.6 mL) and reaction yield of the C8 oligomer was about 180 g (approximately 97%). The C8 oligomer product, a translucent, viscous melt, was ground into a fine powder and purified by Soxhlet extraction in a 3:1 methanol-water solution followed by a distilled water rinse and drying overnight at 80° C. in vacuum.

For the linear acetoxy end-capped oligomer A-M, 40 g of IPA and 93.4 g of RDA was used in the same procedure as above. Resorcinol diacetate (hereinafter RDA) was produced via an analogous process to HQDA from resorcinol. The same mole, mass ratio, catalyst, and temperature conditions were used for the synthesis of RDA as HQDA. The purification of RDA however was carried out via distillation under vacuum to 26 inHg and 100° C. The reaction yield was above 98%.

26 mL of acetic acid was collected after 1 hour at 260° C. (theoretical 27.4) and reaction yield of the A-M oligomer was about 100 g (approximately 96%). The A-M oligomer product was an opaque, low viscosity melt that retained flow even to room temperature. DSC and NMR were used to confirm that both oligomers were of good quality. On curing, the end groups of the oligomers react to form crosslinked ATSP.

B. Dip Coatings

An ATSP oligomer melt was produced by heating A-M and C8 oligomers in a 1.2:2.2 weight ratio to 120° C. with mechanical stirring. At this point, the oligomer formulation evidenced a viscosity less than 400 cP as measured by a spindle-type viscometer. A roughened aluminum coupon was submerged in the melt and withdrawn. The coupon was subsequently cured at 330° C., producing a well adhered 100 μm coating film. Note that this process obviates the use of a solvent to lower viscosity and therefore thickness of deposited oligomer can be controlled via the temperature, i.e., higher temperature yields a less viscous melt producing a thinner coating. At 150° C., the viscosity was less than 320 cP and this higher temperature melt produced a deposited oligomer layer film which was subsequently cured to 70 μm in thickness.

C. Wire Coatings

This process is applicable to wires drawn through the melt, with an aperture of desired radius serving to control wire coating thickness and subsequently drawn through a heating zone at 330° C. to produce a uniform, high temperature stable wire coating. An ATSP oligomer melt was produced by heating A-M and C8 oligomers in a 1.2:2.2 weight ratio to 120° C. with mechanical stirring. At this point, the oligomer formulation evidenced a viscosity less than 400 cP as measured by a spindle-type viscometer.

Necessary times and temperatures to produce a non-brittle coating of ATSP was adjusted by use of finely divided sodium acetate catalyst introduced into the melt at a concentration of up 1 wt % of the oligomer mass. Heating zone temperature could be reduced to 270° C. from 330° C.

Lubricating additives such as with particle diameters less than 40 μm such as graphite, molybdenum disulfide ($MoS_2$), boron nitride (BN), and carbon black as well as perfluorinated lubricating additives such as polytetrafluroethylene (PTFE), perflororoalkoxy (PFA), and fluorinated ethylene propylene (FEP) with particle diameters of less than 20 μm were added to stirred oligomer melts and demonstrated uniform and low roughness coatings.

In one or more embodiments, hydroquinone diacetate (the ATSP component most sensitive to oxidation and referred to above as HQDA) was replaced by units that are more thermally stable to increase the glass transition temperature. The hydroquinone diacetate was replaced with biphenol diacetate in carboxylic acid- and acetoxy-capped oligomers which showed an increase in the oxidative stability of oligomers.

Acetoxybenzoic acid (ABA) and biphenol diacetate (BPDA) were prepared by acetylation of p-hydroxybenzoic acid and dihydroxybiphenyl, respectively. Biphenol diacetate (referred to herein as BPDA) was synthesized by acetylation of biphenol (hereinafter BP) analogously to the synthesis of 4-acetoxybenzoic acid. In this case, 500 g of BP was mechanically stirred in 850 mL of acetic anhydride (molar ratio of about 2.7:8.9) in a cylindrical vessel in an ice-water bath at 10° C. at which point 2-3 drops of sulfuric acid was added to catalyze the acetylation reaction. The solution temperature immediately increased to 80-85° C. due to the exothermic reaction. After allowing the solution to cool to room temperature, BPDA was precipitated out with distilled water. BPDA was then filtered, washed with copious volumes of distilled water and dried in a convection oven at 70° C. for 48 hours. The reaction yield was above 95% as determined by integration of $^1H$ (proton) nuclear magnetic resonance (NMR) spectra.

In the examples provided below, the designated CB1 oligomers were synthesized by melt-condensation of TMA, ABA, IPA and BPDA (molar ratio 1:3:2:2 respectively) at 260° C. in the reactor; and the AB1 oligomers were synthesized similarly with TMA, ABA and BPDA taken in the molar ratio 1:3:3. CB1 and AB1 oligomers were then mixed and cured to make CB1AB1 cured powders.

To produce carboxylic acid end-capped oligomer CB1, 129.4 g TMA, 333 g BPDA, 204.7 g IPA, and 332.9 g ABA were mixed in a 2 L cylindrical reactor flask. The flask was equipped with a three-neck head connected to an inlet inert gas, a screw-type impeller driven by an overhead mechanical stirrer, a J-type thermocouple, and an Allihn-type condenser valve to offer a toggle between reflux and distillation modes. The reactor was continuously purged with argon while emplaced within a Glas-Col aluminum-housed electric heating mantle operated via temperature controller with the thermocouple operating as feedback. The reactor was heated to 260° C. for 30 min to obtain a low-viscosity melt during which stirring was maintained at 300 revolutions per minute (rpm) and which evidenced a substantial acetic acid by-product which was refluxed during this stage. After refluxing for 30 minutes, the condenser was toggle to distillation mode and acetic acid condensation by-product was collected in an Erlenmeyer flask and the mass of the acetic acid was continuously monitored by digital weighing balance which indicated the extent of reaction. The reaction was stopped with 220 mL of acetic acid collected (theoretical 258 mL). Reaction yield of the CB1 oligomer was about 696 g (approximately 94%). The CB1 oligomer product, a viscous melt, was ground into a fine powder. Average molecular weight of oligomer product was determined by ratio of integrated proton NMR spectra between ester and carboxylic acid end group protons and was within 1% of theoretical molecular weight. Theoretical molecular weight is determined by subtraction of the number of moles of acetoxy functional groups in the reactor feed mass multiplied by the mass of acetic acid from the molecular weight of the feed monomers times their monomer ratio within the feed mass. The CB1 oligomer product, a viscous melt at 260° C. and a brittle solid at 23° C., was ground into a fine powder.

For the carboxylic acid end-capped oligomer CB2, 86.8 g TMA, 205.9 g IPA, 372.2 g ABA, and 335.1 g BPDA were used with the same procedure as above for CB1 oligomer. 215 mL of acetic acid was collected after 3 hours at 260° C. (theoretical 272.9 mL) and reaction yield of the CB2 oligomer was 690.8 g (approximately 95%). Average molecular weight of oligomer product was likewise as for oligomer CB2 determined to be within 1% of theoretical molecular weight. The CB2 oligomer product, a viscous melt at 260° C. and a brittle solid at 23° C., was ground into a fine powder.

For the acetoxy end-capped oligomer AB1, 134.6 g TMA, 346.1 g ABA, and 519.3 g BPDA were used with the same procedure as above. 195 mL of acetic acid was collected after 3 hours at 260° C. (theoretical 230 mL) and reaction yield of the AB1 oligomer was about 731 g (approximately 95%). Average molecular weight of oligomer product was determined by ratio of integrated proton NMR spectra between ester and acetoxy end group protons and was within 1% of theoretical molecular weight. Theoretical molecular weight is determined by subtraction of the number of moles of carboxylic acid functional groups in the reactor feed mass multiplied by the mass of acetic acid from the molecular weight of the feed monomers times their monomer ratio within the feed mass. The AB oligomer product, a viscous melt at 260° C. and a brittle solid at 23° C., was ground into a fine powder.

For the acetoxy acid end-capped oligomer AB2, 89.1 g TMA, 70.4 g IPA, 382.0 g ABA, and 458.5 g BPDA were used with the same procedure as above for AB1 oligomer. 203.7 mL of acetic acid was collected after 3 hours at 260° C. (theoretical 254.6 mL) and reaction yield of the AB oligomer was 715.7 g (approximately 96%). Average molecular weight of oligomer product was likewise as for oligomer AB2 determined to be within 1% of theoretical molecular weight. The AB2 oligomer product, a viscous melt at 260° C. and a brittle solid at 23° C., was ground into a fine powder.

PTFE was demonstrated to be a potent lubricating agent, enabling low wear and COF when blended with ATSP at low weight percent, therefore we tailored the ATSP polymer backbone to incorporate fluorinated ethylene units. For this purpose, perfluorosebacic acid (PFSA) was used. A1F, C1F, A2F and C2F, which are analogous to amorphous oligomers A1 and C1 and liquid crystalline oligomers A2 and C2, respectively, with a small concentration of PFSA (5% weight) were synthesized.

To produce carboxylic acid end-capped perfluorinated oligomer C1F, 37.9 g TMA, 12.5 g PFSA, 40.6 g IPA, 97.3 g ABA, and 70.0 g HQDA were mixed in a 500 mL spherical reactor flask and a reaction procedure analogous to that of CB1 oligomer was conducted. The flask was equipped with a three-neck head connected to an inlet inert gas, a screw-type impeller driven by an overhead mechanical stirrer, a J-type thermocouple, and an Allihn-type condenser valve to offer a toggle between reflux and distillation modes. The reactor was continuously purged with argon while emplaced within a Glas-Col aluminum-housed electric heating mantle operated via temperature controller with the thermocouple operating as feedback. The reactor was heated to 260° C. for 15 min to obtain a low-viscosity melt during which stirring was maintained at 300 revolutions per minute (rpm) and which evidenced a substantial acetic acid by-product which was refluxed during this stage. After refluxing for 15 minutes, the condenser was toggle to distillation mode and acetic acid condensation by-product was collected in a 100 mL graduated cylinder and the mass of the acetic acid was continuously monitored by observation of volume, which indicated the extent of reaction. The reaction was stopped with 64 mL of acetic acid collected (theoretical 75.7 mL). Reaction yield of the C1F oligomer was 178.9 g (approximately 98%). The C1F oligomer product, a viscous melt at 260° C. and a brittle solid at 23° C., was ground into a fine powder.

For the carboxylic acid end-capped perfluorinated oligomer C2F, 19.2 g TMA, 56.5 g IPA, 98.9 g ABA, 71.1 g HQDA, and 12.5 g PFSA were used with the same procedure as above. 65 mL of acetic acid was collected at 260° C. (theoretical 76.9 mL) and reaction yield of the C2F oligomer was about 178.7 g (approximately 98%). The C2F oligomer product, a viscous melt at 260° C. and a brittle solid at 23° C., was ground into a fine powder.

For the acetoxy end-capped perfluorinated oligomer A1F, 42.5 g TMA, 29.4 g IPA, 36.5 g ABA, 137.5 g HQDA, and 12.5 g PFSA were used with the same procedure as above. 61.5 mL of acetic acid was collected at 260° C. (theoretical 72.8 mL).

For the acetoxy end-capped fluorinated oligomer A2F, 21.8 g TMA, 30.2 g IPA, 93.3 g ABA, 100.6 g HQDA, and 12.5 g PFSA were used with the same procedure as above. 63 mL of acetic acid was collected at 260° C. (theoretical 74.2 mL).

In the perfluorinated oligomer examples above it is also possible to replace HQDA with BPDA as noted above for the synthesis of the CBF and ABF oligomers.

In addition, the CB and AB oligomers are synthesized as dry powders and then mixed together to form the aromatic thermosetting copolyester powder, which are used for electrostatic spraying onto a surface of a substrate to form a coating on the surface. The formed aromatic thermosetting copolyester could be further dissolved in a solvent for purposes of spraying the liquid itself onto the surface.

In addition to the above, the aromatic thermosetting copolyester can be further mixed with PTFE to provide better performance. In some aspects the PTFE additives in concentrations ranging from 1 wt % up to 5 wt % of oligomer mass.

As noted herein, the C# oligomers are designed to have an excess of carboxylic acid functional groups such that the oligomer product from the batch reaction can later be reacted (during the coating stage) with an A# oligomer which has an excess of acetoxy caps. As seen, the ratio of carboxylic acid to acetoxy caps within the cured resin coating can then be determined based on the feed ratio of the oligomers into the deposited electrostatic powder or solvent-borne oligomer. The feed ratio is generally chosen to be equimolar on a functional end cap basis such that a more fully crosslinked structure can be produced. An exception to this case is the C1A2 and C2A1 oligomers, which have a feed ratio selected such that they produce a bias of carboxylic acid or acetoxy groups within the cured resin. As provided in Table 10 the oligomers are listed with the acetoxy AcO and carboxylic acid COOH functional cap counts. As shown from the sum value when COOH (carboxylic acid) is greater than AcO (acetoxy), the product oligomer will have (on average, since it is a condensation product) an access of carboxylic acid functional caps. Similarly listed when AcO is greater an access of acetoxy acid functional caps would be present. A similar process is used for all non-perfluorinated ATSP oligomers.

TABLE 10

|  |  | TMA | IPA | 4-ABA | BPDA | PFSA | HQDA | TOTAL |
|---|---|---|---|---|---|---|---|---|
| AB | COOH | 3 | 0 | 3 | 3 | — | — | 6 |
|  | AcO | 0 | 0 | 3 | 6 | — | — | 9 |
| A1 | COOH | 2 | 2 | 2 | — | — | 7 | 12 |
|  | AcO | 0 | 0 | 2 | — | — | 14 | 16 |
| A2 | COOH | 3 | 4 | 5 | — | — | 0 | 12 |
|  | AcO | 0 | 0 | 5 | — | — | 10 | 15 |
| CB | COOH | 3 | 4 | 3 | 0 | — | — | 10 |
|  | AcO | 0 | 0 | 3 | 4 | — | — | 7 |
| C1 | COOH | 6 | 6 | 6 | 0 | — | — | 18 |
|  | AcO | 0 | 0 | 6 | 8 | — | — | 14 |
| C2 | COOH | 3 | 8 | 6 | 0 | — | — | 17 |
|  | AcO | 0 | 0 | 6 | 8 | — | — | 14 |
| AB2 | COOH | 3 | 2 | 5 | 0 | — | — | 10 |
|  | AcO | 0 | 0 | 5 | 8 | — | — | 13 |
| CB2 | COOH | 3 | 6 | 5 | 0 | — | — | 14 |
|  | AcO | 0 | 0 | 5 | 6 | — | — | 11 |
| C1F | COOH | 6 | ~5.4 | 6 | — | ~.5 | 0 | ~18 |
|  | AcO | 0 | 0 | 6 | — | 0 | 8 | 14 |
| C2F | COOH | 3 | ~7.4 | 6 | — | ~.5 | 0 | ~17 |
|  | AcO | 0 | 0 | 6 | — | 0 | 8 | 14 |
| A1F | COOH | 6 | ~3.5 | 2 | — | ~.5 | 0 | 12 |
|  | AcO | 0 | 0 | 2 | — | 0 | 14 | 16 |
| A2F | COOH | 3 | ~.5 | 5 | — | ~3.5 | 0 | 12 |
|  | AcO | 0 | 0 | 5 | — | 0 | 10 | 15 |

Figure 19:
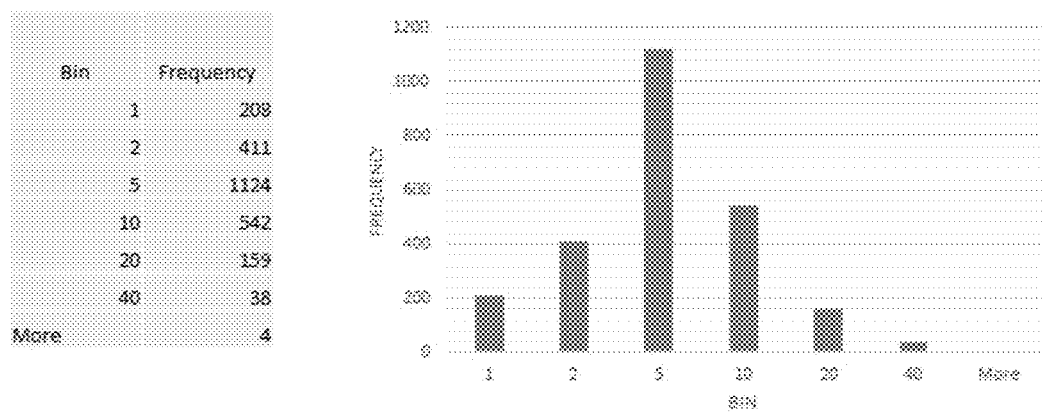
FIG. 19 represents observed particle size ranges as determined by image analysis of a series of transmitted light micrographs, where frequency is based on counts of particles within stated micron diameter.
Figure 20:
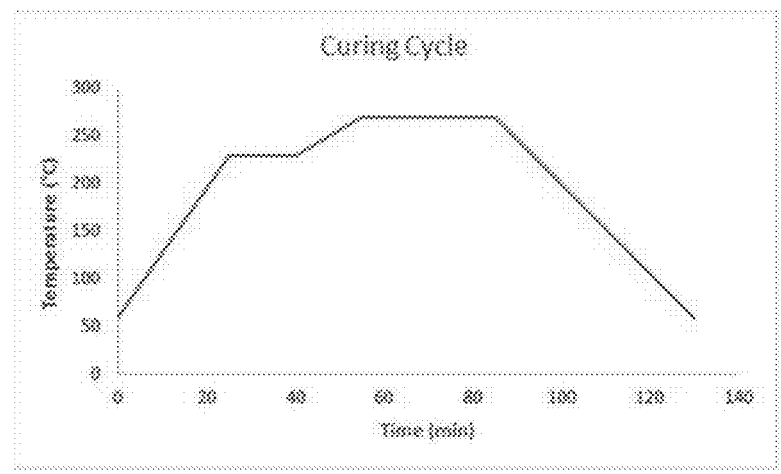
FIG. 20 illustrates a typical cure schedule for a powder coating method of coating a substrate with ATSP powder.

Electrostatic powder coating (an industrially accepted coating process) has been examined to coat the metal substrates. As above, ATSP oligomeric powders were ground to a fine powder and passed through a 90 μm sieve utilizing a vibratory shaker apparatus, and ground more to achieve finer particles. A sample of sieved powder was used to determine number average particle size distribution via microscopic image analysis. Individual particles observed were separated into several bins of range of primary diameter (in microns) and a histogram was constructed on this basis (FIG. 19). In this process, the oligomeric powder was negatively charged via an electrostatic powder coating gun and projected towards a positively-charged conductive metal panel. The charged particles repel each other resulting in evenly dispersing themselves on the substrate as they exit the nozzle. The coated substrates were then cured to 270° C. FIG. 20 illustrates a representative cure cycle for this process in an oven.

Table 11 quantifies characteristics of crosslinked carboxylic acid end capped oligomers and acetoxy end-capped oligomers in various combinations of oligomer species that have been used for electrostatic spray application. Oligomer mass feed ratio was calculated on the basis of equimolar concentration of acetoxy and carboxylic acid functional groups

TABLE 11

Oligomer mass feed ratio of applied coatings of crosslinked ATSP.

| Sample | Oligomer mass feed ratio (C#/A#) |
|---|---|
| C1A1 | 1.1 |
| C2A2 | 1.1 |
| C1A2 | 1.14 |
| C2A1 | 1.08 |
| CBAB | 1 |
| CB2AB2 | 1 |

TABLE 11-continued

Oligomer mass feed ratio of applied coatings of crosslinked ATSP.

| Sample | Oligomer mass feed ratio (C#/A#) |
|---|---|
| C1FA1F | 1.1 |
| C2FA2F | 1.1 |
| C1FA2F | 1.14 |
| C2FA1F | 1.08 |

Figure 21:
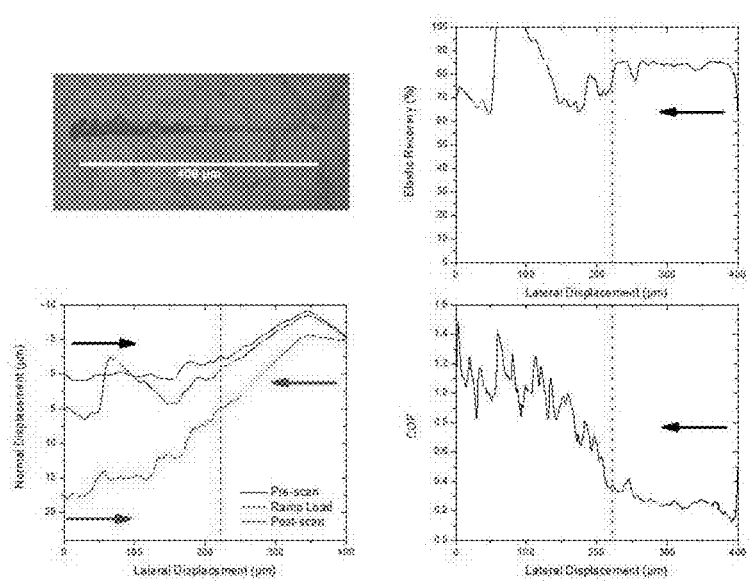
FIG. 21 demonstrates scratch experiment results conducted on an ATSP-coated Q-panel.

FIG. 21 illustrates the results of scratch experiments performed on ATSP (biphenol based)-coated panels. As shown, the critical force of 35-40 mN and the elastic recovery of 79-86% were observed. This is qualitatively in-line with results for solution-based C1A1 coatings (FIG. 5), indicating that both the new chemistry and the new deposition technique can produce tribologically robust coatings.

Figure 22:
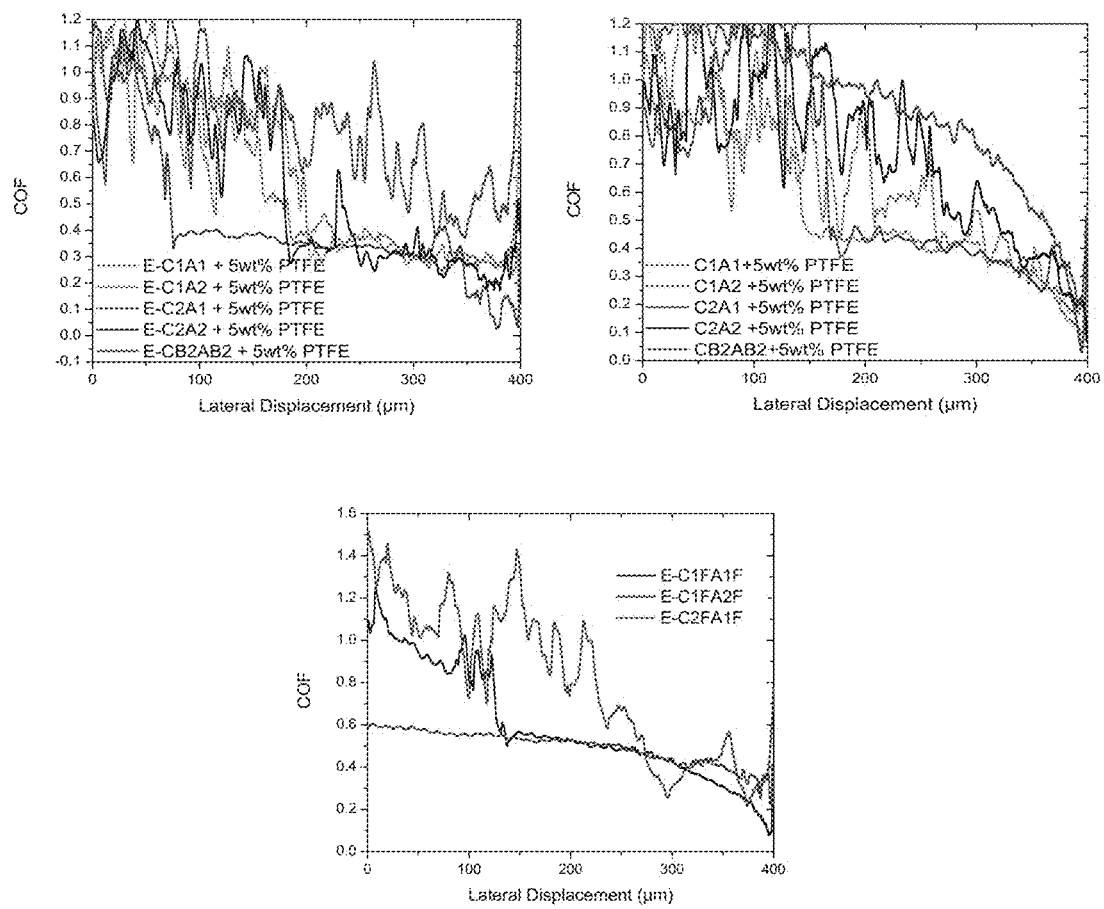
FIG. 22 demonstrates scratch experiments results conducted on ATSP-coated Q-panels; (top left) powder coating, (top right) solvent-borne coating of equivalent chemistry and additive concentration, (bottom) oligomers incorporating perfluorinated alkanes as a backbone constituent.

Electrostatic spray has also been examined to coat the metal substrates with different ATSP formulations (C1A2, C2A1, C1A1, C2A2 and CB2AB2 with 5 wt % oligomer mass of PTFE). These powder coatings offer unmatched thermal and mechanical performance with easy application and high uniformity; therefore, this method can be used to coat parts with complex geometries. The oligomers are simply mixed along with any additives and then further mixed to ensure the additives are incorporated. Once mixed the formulation is then electrostatically sprayed unto a surface. The powder coated surface is then placed in an oven and backed. Baking may be at 230° C. for approximately 10 minutes, followed by baking at 270° C. for approximately 30 minutes. After heating the surface is allowed to cool to room temperature. FIG. 22 illustrates the results of scratch experiments performed on ATSP solvent-borne and electrostatic spray-coated panels. The COF results for electrospray coated panels are qualitatively in-line or even better indicating that the electrostatic deposition technique can produce tribologically robust coatings. With scratch indentations proceeding from right to left in these experiments, an abrupt point further to the left indicates a higher normal load to initiate a critical transition according to (400−X μm)/(400 μm)*80 mN. Critical transition point is the transition from a regime of coating integrity with deformation recovered elastically to one of cohesive failure via plowing action of the indenter tip. Results indicate that C1A1 and C2A1 chemistries and their analogs incorporating perfluorinated alkanes as a backbone constituent possess remarkable resistance to micromechanically instrumented scratch experiments.

Figure 23:
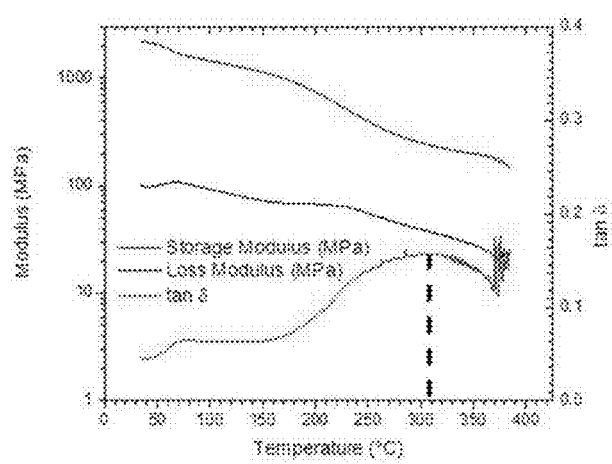
FIG. 23 graphs traces of storage modulus, loss modulus and tan δ for representative neat, cured CBAB samples.

FIG. 23 is a graph of dynamic mechanical analysis (DMA) data observed on a cured specimen of a CBAB specimen in a TA Instruments Q800 Dynamic Mechanical Analyzer. Sample was ramped to 400° C. at 3° C./min at a 1 Hz oscillatory rate in a film tension clamp. The storage modulus, loss modulus, and tan δ curves were recorded during this experiment and glass transition temperature denoted by peak in the tan δ curve. Observed glass transition temperature is therefore judged to be 307° C. This glass transition temperature is significantly (more than 100° C.) higher than any known commercial powder coating chemistry.

TABLE 12

COF and wear data for various ATSP spray coated disks under lubricated and unidirectional conditions.

| Material | COF | Wear depth (um) | wear rate (mm^3/N*m) | Working condition |
|---|---|---|---|---|
| CBAB + 1.4% PTFE | 0.11 | 0.4 | 4.4E−08 | 15.6 Mpa 17280 m with lubricant |
| C1FA2F | 0.112 | 1.06 | 4.6E−07 | 15.6 Mpa 4320 m with lubricant |
| C2FA1F | 0.108 | 1.23 | 5.4E−07 | 15.6 Mpa 4320 m with lubricant |
| DuPont 958-414 | 0.148 | 2.84 | 1.5E−06 | 13 Mpa 4320 m lubricant |
| 1704 PEEK/PTFE | 0.12 | 6.87 | 3.6E−06 | 13 Mpa 4320 m lubricant |

TABLE 13

COF and wear data for various ATSP spray coated disks under unlubricated and unidirectional conditions.

| Material | COF | Wear depth (um) | wear rate (mm^3/N*m) | Working condition |
|---|---|---|---|---|
| C2A1 + 4% PTFE | 0.175 | 0.1 | 4.4E−08 | 15.6 Mpa 4320 m Dry |
| CBAB + 1.4% PTFE | 0.153 | 1.1 | 4.8E−07 | 15.6 Mpa 4320 m Dry |
| C1A2 + 5% PTFE | 0.15 | 1.46 | 6.4E−07 | 15.6 Mpa 4320 m Dry |
| DuPont 958-414 | 0.15 | 2.4 | 1.0E−06 | 15.6 Mpa 4120 m Dry |
| 1704 PEEK/PTFE | 0.16 | 2.68 | 1.2E−06 | 15.6 Mpa 4320 m Dry |
| C1FA2F | 0.22 | 10.7 | 4.7E−06 | 15.6 Mpa 4320 m Dry |
| C2FA1F | 0.24 | 22.3 | 4.0E−05 | 15.6 Mpa 1050 m Dry |

Figure 24:
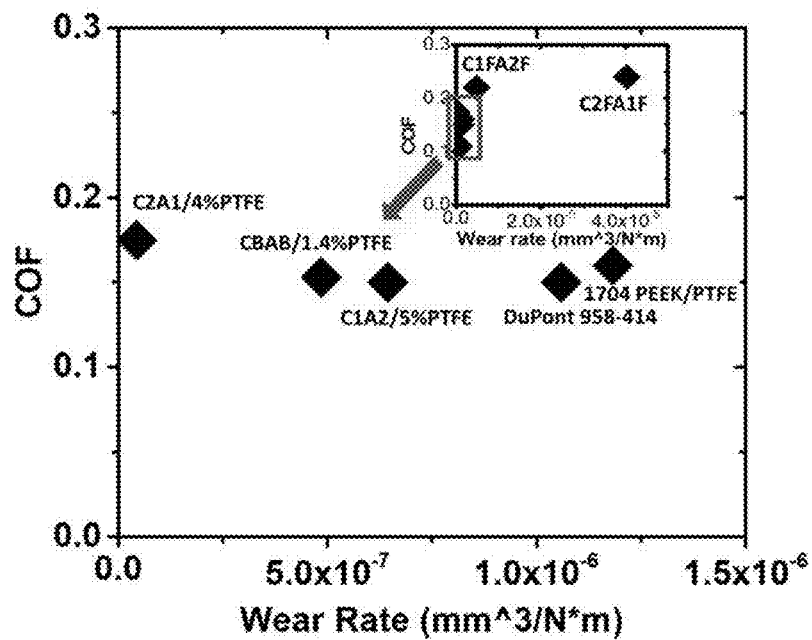
FIG. 24 and FIG. 25 illustrates the wear rates and coefficients of friction of ATSP coatings under unlubricated unidirectional tribological experiment.
Figure 25:
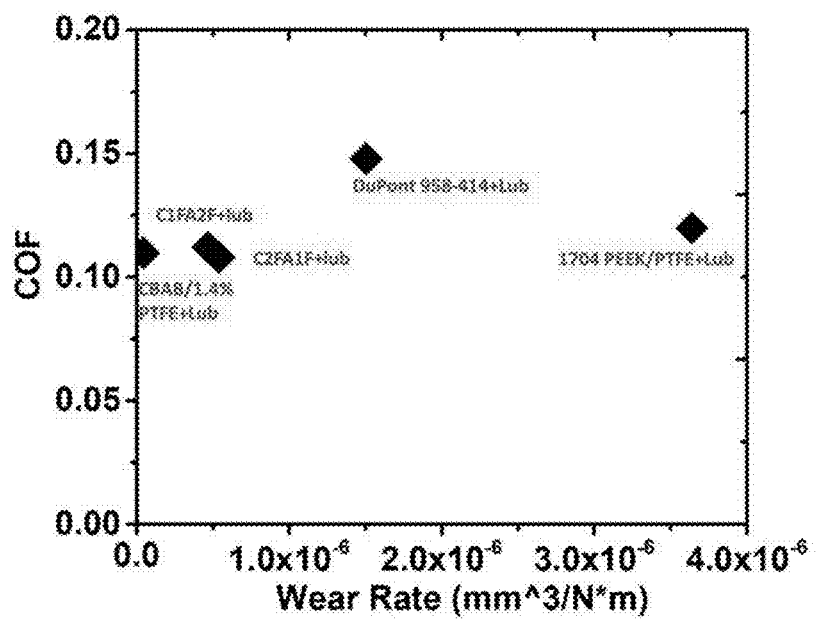

FIGS. 24 and 25 (using data from Tables 11 and 12) illustrate the results of sliding contact tribological experiments via a high pressure tribometer under lubricated (using ISO 46 Mineral) and unlubricated conditions. This was conducted in a pin-on disk configuration where the uncoated 4130 steel pin was held stationary and the coated disks rotated. These experiments were conducted in room temperature with a chamber pressure of 15.6 MPa. Wear tracks were observed by profilometry and the wear rate was calculated by integration of the track area times wear depth divided by normal force times sliding distance. In all cases, ATSP-based coatings outperformed state-of-art polymeric coatings.

Embodiments of the present invention may provide protective coatings applicable to seals, cookware, bearings, mold release coatings, pistons, hydraulic parts, gears, nuts and bolts, noise prevention, and handling applications (items sliding or rolling during an industrial process or user action).

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A method of coating a substrate with an aromatic thermosetting copolyester, comprising:
   preparing a powder comprising an aromatic thermosetting copolyester;
   electrostatically spraying the powder onto a surface of a substrate to form a coating on the surface of the substrate; and
   heating the surface of the substrate, and
   wherein the aromatic thermosetting copolyester is selected from the group consisting of:
   an aromatic thermosetting copolyester comprising a first oligomer having a carboxylic acid end group and a second oligomer having an acetoxy end group, wherein the ratio of carboxylic acid end groups to acetoxy end groups is greater than 1:1, and wherein the first and second oligomers are both formed from at least four monomers and wherein one of the at least four monomers in both the first and second oligomers is biphenol diacetate (BPDA), and
   an aromatic thermosetting copolyester comprising a first oligomer having a carboxylic acid end group and a second oligomer having an acetoxy end group, wherein the ratio of carboxylic acid end groups to acetoxy end groups is smaller than 1:1, and wherein the first and second oligomers are both formed from at least four monomers and wherein one of the at least four monomers in both the first and second oligomers is biphenol diacetate (BPDA),
   wherein the remaining monomers from the at least four monomers for both the first and second oligomers are formed from a selection of the following:
   a second monomer chosen from the group consisting of 4-acetoxybenzoic acid (ABA), 3-acetoxybenzoic acid, and 6-acetoxy-2-napthoic acid,
   a third monomer chosen from the group consisting of trimesic acid (TMA), 1-hydroxypropane-1,2,3-tricarboxylic acid, 3,5-diacetoxybenzoic acid, 5-acetoxyisophthalic acid, [1,1'-biphenyl]-3,3',5,5'-tetracarboxylic acid,
   propane-1,2,3-tricarboxylic acid, 2,2-bis(acetoxymethyl)propane-1,3-diyl diacetate, benzene-1,3,5-triyl triacetate, dimethyl 3,3-bis(2-methoxy-2-oxoethyl) pentanedioate, and pyromellitic dianhydride, and
   a fourth monomer chosen from the group consisting of isophthalic acid (IPA),
   4,4'-oxydibenzoic acid, [1,1'-biphenyl]-4,4'-dicarboxylic acid, benzoic acid,
   cyclohexane-1,3-dicarboxylic acid, cyclohexane-1,4-dicarboxylic acid,
   terephthalic acid, azelaic acid acid, sebacic acid, perfluoroazelaic acid, and perfluorosebacic acid; and
   wherein either the first or second oligomer is further formed with a fifth monomer selected from perfluorosebacic acid (PFSA) to form a perfluorinated oligomer.

2. The method of claim 1, wherein the aromatic thermosetting copolyester is formed by crosslinking the first oligomer and the second oligomer by curing in the presence of a catalyst.

3. The method of claim 2, wherein the average molecular weight between crosslinks of the aromatic thermosetting copolyester is approximately 1,100 to 1,200 grams per mole.

4. The method of claim 1 further comprising mixing the powder comprising the aromatic thermosetting copolyester with polytetraflurorethylene (PTFE).

5. The method of claim 4, wherein the PTFE is added in a concentration ranging from approximately 1 wt % to approximately 5 wt % of a total mass of the aromatic thermosetting copolyester.

6. A method of coating a substrate with an aromatic thermosetting copolyester, comprising:
   preparing a powder comprising an aromatic thermosetting copolyester;
   electrostatically spraying the powder onto a surface of a substrate to form a coating on the surface of the substrate; and
   heating the surface of the substrate, and
   wherein the aromatic thermosetting copolyester is selected from the group consisting of:
      an aromatic thermosetting copolyester comprising a first oligomer having a carboxylic acid end group and a second oligomer having an acetoxy end group, wherein the ratio of carboxylic acid end groups to acetoxy end groups is greater than 1:1, and wherein the first and/or the second oligomers are formed from at least five monomers, and one of the at least five monomers is perfluorosebacic acid (PFSA) to form a perfluorinated oligomer, and
      an aromatic thermosetting copolyester comprising a first oligomer having a carboxylic acid end group and a second oligomer having an acetoxy end group, wherein the ratio of carboxylic acid end groups to acetoxy end groups is smaller than 1:1, and wherein the first and/or the second oligomers are formed from at least five monomers, and one of the at least five monomers is perfluorosebacic acid (PFSA) to form a perfluorinated oligomer, and
   wherein at least one of the first oligomer and the second oligomer is formed from:
      a first monomer chosen from the group consisting of biphenol diacetate, 1,4-phenylene diacetate; 1,3-phenylene diacetate; [1,1'-biphenyl]-4,4'-diyl diacetate; propane-2,2-diylbis(4,1-phenylene) diacetate; sulfonylbis(4,1-phenylene) diacetate (1:1:1:1:1); phenyl acetate; nonane-1,9-diyl diacetate; decane-1,10-diyl diacetate; 4,4'-oxydianiline; benzene-1,4-diamine; and benzene-1,3-diamine;
      a second monomer chosen from the group consisting of 4-acetoxybenzoic acid, 3-acetoxybenzoic acid, and 6-acetoxy-2-napthoic acid;
      a third monomer chosen from the group consisting of trimesic acid (TMA), 1-hydroxypropane-1,2,3-tricarboxylic acid, 3,5-diacetoxybenzoic acid, 5-acetoxyisophthalic acid, [1,1'-biphenyl]-3,3',5,5'-tetracarboxylic acid, propane-1,2,3-tricarboxylic acid, 2,2-bis(acetoxymethyl)propane-1,3-diyl diacetate, benzene-1,3,5-triyl triacetate, dimethyl 3,3-bis(2-methoxy-2-oxoethyl)pentanedioate, and pyromellitic dianhydride; and
      a fourth monomer chosen from the group consisting of isophthalic acid (IPA), 4,4'-oxydibenzoic acid, [1,1'-biphenyl]-4,4'-dicarboxylic acid, benzoic acid, cyclohexane-1,3-dicarboxylic acid, cyclohexane-1,4-dicarboxylic acid, terephthalic acid, azelaic acid acid, sebacic acid, perfluoroazelaic acid, and perfluorosebacic acid.

7. The method of claim 6 further comprising mixing the powder comprising the aromatic thermosetting copolyester with polytetraflurorethylene (PTFE).

8. A method of preparing a coating, comprising:
   preparing a coating precursor comprising an aromatic thermosetting copolyester dissolved in a solvent, and applying the coating precursor onto a surface of a substrate to form a coating on the surface of the substrate, and wherein the aromatic thermosetting copolyester is selected from the group consisting of:
      an aromatic thermosetting copolyester comprising a first oligomer having a carboxylic acid end group and a second oligomer having an acetoxy end group, wherein the ratio of carboxylic acid end groups to acetoxy end groups is greater than 1:1, and wherein the first and second oligomers are both formed from at least four monomers and wherein one of the at least four monomers in both the first and second oligomers is biphenol diacetate (BPDA), and
      an aromatic thermosetting copolyester comprising a first oligomer having a carboxylic acid end group and a second oligomer having an acetoxy end group, wherein the ratio of carboxylic acid end groups to acetoxy end groups is smaller than 1:1, and wherein the first and second oligomers are both formed from at least four monomers and wherein one of the at least four monomers in both the first and second oligomers is biphenol diacetate (BPDA),
   wherein at least one of the first oligomer and the second oligomer is formed from:
      a second monomer chosen from the group consisting of 4-acetoxybenzoic acid, 3-acetoxybenzoic acid, and 6-acetoxy-2-napthoic acid;
      a third monomer chosen from the group consisting of trimesic acid (TMA), 1-hydroxypropane-1,2,3-tricarboxylic acid, 3,5-diacetoxybenzoic acid, 5-acetoxyisophthalic acid, [1,1'-biphenyl]-3,3',5,5'-tetracarboxylic acid, propane-1,2,3-tricarboxylic acid, 2,2-bis(acetoxymethyl)propane-1,3-diyl diacetate, benzene-1,3,5-triyl triacetate, dimethyl 3,3-bis(2-methoxy-2-oxoethyl)pentanedioate, and pyromellitic dianhydride; and
      a fourth monomer chosen from the group consisting of isophthalic acid (IPA), 4,4'-oxydibenzoic acid, [1,1'-biphenyl]-4,4'-dicarboxylic acid, benzoic acid, cyclohexane-1,3-dicarboxylic acid, cyclohexane-1,4-dicarboxylic acid, terephthalic acid, azelaic acid acid, sebacic acid, perfluoroazelaic acid, and perfluorosebacic acid, and
   wherein either the first or second oligomer is further formed with a fifth monomer selected from perfluorosebacic acid (PFSA) to form a perfluorinated oligomer.

9. The method of claim 8, wherein the aromatic thermosetting copolyester is formed by crosslinking the first oligomer and the second oligomer by curing in the presence of a catalyst.

10. The method of claim 8, wherein the solvent further includes polytetrafluoroethylene as an additive.

11. The method of claim 10, wherein the perfluorinated additive is placed in suspension within the solvent by mechanical stirring of the solvent while the perfluorinated additive is present within the solvent.

12. The method of claim 8, wherein the coating precursor is applied onto the surface of the substrate by a wet spraying process.

13. A method of coating a substrate with an aromatic thermosetting copolyester, comprising:
    preparing a powder comprising an aromatic thermosetting copolyester;
    electrostatically spraying the powder onto a surface of a substrate to form a coating on the surface of the substrate; and
    heating the surface of the substrate, and
    wherein the aromatic thermosetting copolyester is selected from the group consisting of:
        an aromatic thermosetting copolyester comprising a first oligomer having a carboxylic acid end group and a second oligomer having an acetoxy end group, wherein the ratio of carboxylic acid end groups to acetoxy end groups is greater than 1:1, and wherein the first and second oligomers are both formed from at least four monomers and wherein one of the at least four monomers in the first and/or second oligomers is biphenol diacetate, and
        an aromatic thermosetting copolyester comprising a first oligomer having a carboxylic acid end group and a second oligomer having an acetoxy end group, wherein the ratio of carboxylic acid end groups to acetoxy end groups is smaller than 1:1, and wherein the first and second oligomers are both formed from at least four monomers and wherein one of the at least four monomers in the first and/or second oligomers is biphenol diacetate,
    wherein at least one of the first oligomer and the second oligomer is formed from:
        a first monomer chosen from the group consisting of 1,4-phenylene diacetate; 1,3-phenylene diacetate; [1,1'-biphenyl]-4,4'-diyl diacetate; propane-2,2-diylbis(4,1-phenylene) diacetate; sulfonylbis(4,1-phenylene) diacetate (1:1:1:1:1); phenyl acetate; nonane-1,9-diyl diacetate; decane-1,10-diyl diacetate; 4,4'-oxydianiline; benzene-1,4-diamine; and benzene-1,3-diamine;
        a second monomer chosen from the group consisting of 4-acetoxybenzoic acid, 3-acetoxybenzoic acid, and 6-acetoxy-2-napthoic acid;
        a third monomer chosen from the group consisting of trimesic acid (TMA), 1-hydroxypropane-1,2,3-tricarboxylic acid, 3,5-diacetoxybenzoic acid, 5-acetoxyisophthalic acid, [1,1'-biphenyl]-3,3',5,5'-tetracarboxylic acid, propane-1,2,3-tricarboxylic acid, 2,2-bis(acetoxymethyl)propane-1,3-diyl diacetate, benzene-1,3,5-triyl triacetate, dimethyl 3,3-bis(2-methoxy-2-oxoethyl)pentanedioate, and pyromellitic dianhydride; and
        a fourth monomer chosen from the group consisting of isophthalic acid (IPA),
        4,4'-oxydibenzoic acid, [1,1'-biphenyl]-4,4'-dicarboxylic acid, benzoic acid,
        cyclohexane-1,3-dicarboxylic acid, cyclohexane-1,4-dicarboxylic acid, terephthalic acid, azelaic acid acid, sebacic acid, perfluoroazelaic acid, and perfluorosebacic acid, and
    wherein either the first or second oligomer is further formed with a fifth monomer selected from perfluorosebacic acid (PFSA) to form a perfluorinated oligomer.

14. The method of claim 13 further comprising mixing the powder comprising the aromatic thermosetting copolyester with polytetraflurorethylene (PTFE).

* * * * *